(12) United States Patent
Fruh et al.

(10) Patent No.: US 10,815,359 B2
(45) Date of Patent: Oct. 27, 2020

(54) NANOCOMPOSITE COMPRISING A LAYER SILICATE AND A RUBBER

(71) Applicant: ARLANXEO DEUTSCHLAND GMBH, Dormagen (DE)

(72) Inventors: Thomas Fruh, Wuppertal (DE); Nadine Gottlieb, Cologne (DE); Alex Lucassen, Dormagen (DE); Andreas Bischoff, Dormagen (DE); Robert Hans Schuster, Hannover (DE); Marion Schellenberg, Hannover (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 141 days.

(21) Appl. No.: 15/773,802

(22) PCT Filed: Nov. 4, 2016

(86) PCT No.: PCT/EP2016/076685
§ 371 (c)(1),
(2) Date: May 4, 2018

(87) PCT Pub. No.: WO2017/077044
PCT Pub. Date: May 11, 2017

(65) Prior Publication Data
US 2018/0319951 A1  Nov. 8, 2018

(30) Foreign Application Priority Data
Nov. 6, 2015  (DE) .......................... 10 2015 014 400

(51) Int. Cl.
C08J 3/215  (2006.01)
C08K 3/34  (2006.01)
C08K 9/04  (2006.01)
C08L 7/00  (2006.01)
C08L 9/00  (2006.01)
C08L 11/00  (2006.01)
C08L 13/00  (2006.01)
C08K 3/04  (2006.01)

(52) U.S. Cl.
CPC ................ *C08K 3/346* (2013.01); *C08K 3/04* (2013.01); *C08K 9/04* (2013.01); *C08K 2201/005* (2013.01); *C08K 2201/011* (2013.01)

(58) Field of Classification Search
None
See application file for complete search history.

(56) References Cited

U.S. PATENT DOCUMENTS 2,531,396 A * 11/1950 Carter .................... C08K 3/346
524/99
6,861,462 B2 * 3/2005 Parker ...................... B60C 1/00
501/145
(Continued)

FOREIGN PATENT DOCUMENTS

DE       003709956 A1 * 10/1988
DE    102007048995 A1 *  4/2009
EP         1125978 A1 *  8/2001

*Primary Examiner* — Tae H Yoon
(74) *Attorney, Agent, or Firm* — Norris McLaughlin, P.A.

(57) ABSTRACT

The invention relates to specific nanocomposites comprising at least one sheet silicate and at least one rubber, to a process for production thereof and to various products based on these nanocomposites.

14 Claims, 7 Drawing Sheets

(56) References Cited

U.S. PATENT DOCUMENTS

2004/0147661 A1* 7/2004 Yaakub ................. C08K 3/346
 524/445
2010/0190908 A1* 7/2010 Kumaki ................. C01B 33/44
 524/445

* cited by examiner

NANOCOMPOSITE COMPRISING A LAYER SILICATE AND A RUBBER

This application is a 371 of International Patent Application No. PCT/EP2016/076685, filed Nov. 4, 2016, which claims priority of Germany Patent Application No. 10 2015 014 400.6, filed Nov. 6, 2015, the entire disclosures of which patent applications are hereby incorporated herein by reference.

The invention relates to specific nanocomposites comprising at least one sheet silicate and at least one rubber, to a process for production thereof and to various products, preferably elastomers, based on these nanocomposites.

PRIOR ART

Sheet silicates are encountered in nature, for example in the form of mica, and are notable for the ease with which they can be split. This is because the sheet silicates are formed from many layers of ultrathin silicate platelets. These silicate platelets have dimensions in the nanoscale range. Their thicknesses are typically in the range from 1 to 10 nanometers, and the lengths are usually more than 100 nanometers. It is a feature of these silicate platelets that they are impenetrable to liquids and gases and that they have elastic properties. The property of being impenetrable to liquids and gases is utilized technologically for inhibition of diffusion. In rubber, for example, the sheet silicate platelets make it difficult for diffusing molecules to diffuse because they have to travel extended distances to get round the silicate platelets. The elastic properties of these silicate platelets ensure that they do not break even under flexural stress, and for that reason the use of these silicate platelets is especially suitable in rubber products subject to flexural stress. Sheet silicates are therefore used for the production of polymer nanocomposites, where they improve the properties of the polymer in terms of mechanical or barrier properties compared to the unfilled polymers.

Relatively strong bonds of chemical and electrical nature between the individual sheets of silicate platelets in a sheet silicate have the effect that complete individualization of the individual silicate platelets has not been possible to date. The result of all individualization attempts has always been merely to obtain conglomerates of a multitude of mutually adhering silicate platelets, called tactoids.

Other important prerequisites for the industrial utilization of sheet silicates, however, are the prevention of the agglomeration of the nanoparticles produced from the sheet silicates and the assurance of delamination (exfoliation) of the sheet silicates. This is often assured through a modification of the particle surface or through the exchange of the cations of the sheet silicates for voluminous organic cations. The compounding of the nanoparticles and the homogeneous distribution of the particles in a polymer matrix and the dispersing to obtain nanoscale character is crucial for successful use in plastics or rubbers. Compounding is a term from the plastics industry, synonymous with plastics processing, that describes the process of upgrading plastics by mixing in admixtures (fillers, additives etc.) for specific optimization of the profiles of properties. Compounding is preferably effected in extruders.

It is known that conventional sheet silicates which are known as fillers, such as talc or mica, cannot be exfoliated and either cannot be intercalated at all or can be intercalated only under extreme conditions (K. Tamura, S. Yokoyama, C. S. Pascua, H. Yamada, Chem. Mater, 2008, 20, 2242-2246). In an intercalated structure, the distances between the individual silicate platelets have already been increased, but silicate platelets are not completely separated from one another. In the form of tactoids, by contrast, the silicate platelets may be dispersed homogeneously in a plastic, rubber or vulcanizate. In that case, reference is made to an intercalate. Frequently, polymeric nanocomposites have a hybrid structure, in that they contain both exfoliated silicate platelets and intercalated regions.

In this regard see: http://wiki.polymerservice-merseburg.de/index.php/Schichtsilikatverst%C3%A4rkte_Polymere.

An exfoliated and hence ideal structure, by contrast, is characterized by the separation of the individual silicate platelets of the sheet silicates and the complete and homogeneous distribution thereof within the material.

If talc or mica are used as fillers, the mechanical properties of resulting nanocomposite materials are much poorer than when swellable sheet silicates, for example montmorillonites, are used, which lead to intercalated or partly exfoliated nanocomposites. Talc or mica lead to conventional composites with poor attachment of the filler to and distribution of the filler in the polymer.

In order to introduce sheet silicates into polymeric materials, a first prerequisite set in the literature is generally intercalation of the sheet silicates to be used. In the first step hydrophobization opens up the layers in the sheet silicate, then in the second step compatibilization is effected for the organic matrix of the polymer to be additized. The opening-up of the layers is necessary in order to facilitate the introduction into polymers that are to get into the interstitial space in the opened-up sheet silicate and are to lead to exfoliation in situ, i.e. to maximum splitting into individual sheet silicates or tactoids (sheet agglomerates) and hence to maximum homogeneity of distribution in the matrix of the polymer. The increase in the aspect ratio additionally associated with exfoliation into individual silicate platelets is regarded as an essential prerequisite for the production of polymer-sheet silicate nanocomposites having improved properties (H. A. Stretz, D. R. Paul, R. U, H. Keskkula, P. E. Cassidy, Polymer 2005, 46 2621-2637). Intercalatable and exfoliable sheet silicates are preferably montmorillonites or hectorites from the class of the smectites.

The common view is that substantial exfoliation is required for the improvement of the composite properties of polymer-sheet silicate nanocomposites in order to achieve, even with small dosages of sheet silica, a high contact surface area and hence an optimal effect in relation to the properties of polymer-sheet silicate nanocomposites. This exfoliation is generally accomplished in situ by chemical or physical-mechanical processes during the processing.

EP 2 168 918 A1 discloses a process for producing nonswellable sheet silicate tactoids by producing synthetic smectites via high-temperature melt synthesis and "aqueously" dispersing them by agitation.

DE 10 2007 048 995 A1 discloses a process for individualization of silicate platelets from sheet silicates, by introducing them into an alkaline medium, which opens up or swells the sheet silicates. The resulting semifinished product of opened-up sheet silicates is combined and mixed vigorously with a rubber latex in a flow reactor by means of extensional flow in a tube which narrows in flow direction, with penetration of the rubber of the latex into the interstices of the layers between the silicate platelets, opening-up of the layer separations and loosening of the bonds. As a result, the silicate platelets are separated from one another in the laminar flow of the flow reactor. After exit from the flow reactor, the rubber composite material in which the individualized silicate platelets are surrounded by rubber is coagulated and precipitated with the aid of an organic solvent and salts. The process according to DE 10 2007 048 995 A1 is referred to hereinafter as static latex compounding (SLC).

Proceeding from this prior art, the problem addressed was that of further improving the individualization of silicate platelets from sheet silicates in situ by chemical or physical-mechanical processes, with the aim of substantial avoidance of tactoids and resulting rubber-based products with improved properties.

It has been found that, surprisingly, improved exfoliation of sheet silicates with substantial avoidance of tactoids affords nanocomposites that considerably improve the profile of properties of rubber-based products, in that a coagulate is introduced directly into the extensional flow of aqueous solution of a sheet silicate and latex by means of a mixing unit mounted in the flow reactor, preferably a mixing nozzle.

Invention

The invention provides nanocomposites composed of sheet silicate particles which are encased by a rubber matrix and contain at least one sheet silicate and at least one rubber from the group of natural rubber, ethylene-propylene-diene rubbers, ethylene-vinyl acetate rubbers, ethylene-acrylate rubbers, acrylate rubbers, fluoro rubbers, styrene/diolefin rubbers, polychloroprenes, polybutadiene rubbers, polyisoprenes, butyl rubber, halobutyl rubbers, nitrile rubbers, carboxylated nitrile rubbers, hydrogenated nitrile rubbers and carboxylated hydrogenated nitrile rubbers, characterized in that the sheet silicate content is ≤6% by volume and
50% of the sheet silicate particles in the rubber matrix have a maximum median particle size d50 in the range from 100 to 200 nm, wherein the particle size is determined by transmission electron microscopy according to ISO 29301.

By way of clarification, it should be noted that, in the context of the present application, ≤6% by volume does not include the value of zero. All standards in the context of the present invention relate to the version applicable at the filing date.

By way of clarification, it should additionally be noted that the scope of the present invention encompasses all the definitions and parameters mentioned hereinafter in general terms or specified within areas of preference, in any desired combinations. Unless stated otherwise, all percent figures are percentages by mass according to DIN 1310. With regard to the $d_{50}$ values in this application, their determination and their significance, reference is made to Chemie Ingenieur Technik 72, 273-276, 3/2000, Wiley-VCH Verlags GmbH, Weinheim, 2000, according to which the do is that particle size below which 50% of the amount of particles lie (median).

The application also provides a process for producing nanocomposites, wherein a) a sheet silicate-containing raw material is introduced into an aqueous medium and hence the layers of the silicate platelets in the sheet silicate are opened up,
b) this semifinished product comprising opened-up silicate platelet layers is mixed with at least one latex,
c) the mixture is supplied to a flow reactor and converted to a laminar extensional flow,
d) the mixture in laminar extensional flow with the greatly or completely separated silicate platelets present therein is admixed and mixed in at least one mixing unit, preferably mixing nozzle or precipitation nozzle, with a coagulant based on at least one acid or at least one salt, and finally
e) the intermediate obtained in d) is collected and isolated in an alkaline, aqueous medium, wherein at least one rubber from the group of natural rubber, ethylene-propylene-diene rubbers, styrene/diolefin rubber, polybutadiene rubber, polychloroprene, polyisoprene, butyl rubber, halobutyl rubber, nitrile rubber, carboxylated nitrile rubber, hydrogenated nitrile rubber and carboxylated hydrogenated nitrile rubber is selected for the latex, wherein the mixing units used are mixing nozzles or precipitation nozzles.

Surprisingly, the process of the invention achieves nanocomposites in which 50% of the sheet silicate particles in the rubber matrix have a maximum median particle size d50 in the range from 100 to 200 nm, preferably in the range from 140 to 160 nm, the particle size being determined by transmission electron microscopy according to ISO 29301.

It is additionally surprising that the combination of process steps c) and d) achieves very substantial exfoliation of the silicate platelets of the sheet silicate. Preferably, nanocomposites of the invention have a mean particle surface area—to be determined by light scattering according to ISO Standard 13320—In the range from 17.5 to 25 $m^2/cm^3$, preferably of more than 22 $m^2/cm^3$.

The present application thus provides nanocomposites produced by a process wherein a) a sheet silicate-containing raw material is introduced into an aqueous medium and hence the layers of the silicate platelets in the sheet silicate are opened up,
b) this semifinished product comprising opened-up silicate platelet layers is mixed with at least one latex,
c) the mixture is supplied to a flow reactor and converted to a laminar extensional flow,
d) the mixture in laminar extensional flow with the greatly or completely separated silicate platelets present therein is admixed and mixed in at least one mixing unit, preferably mixing nozzle or precipitation nozzle, with a coagulant based on at least one acid or at least one salt, and finally
e) the intermediate obtained in d) is collected and isolated in an alkaline, aqueous medium, wherein at least one rubber from the group of natural rubber, ethylene-propylene-diene rubbers, styrene/diolefin rubber, polybutadiene rubber, polychloroprene, polyisoprene, butyl rubber, halobutyl rubber, nitrile rubber, carboxylated nitrile rubber, hydrogenated nitrile rubber and carboxylated hydrogenated nitrile rubber is selected for the latex, wherein the mixing units used are mixing nozzles or precipitation nozzles.

The nanocomposites produced by the process are characterized in that the sheet silicate content is ≤6% by volume and
50% of the sheet silicate particles in the rubber matrix have a maximum median particle size d50 in the range from 100 to 200 nm, the particle size being determined by transmission electron microscopy according to ISO 29301.

The proportion by mass used in the context of the present invention and the proportion by volume, the latter variously also being referred to as volume fraction, according to DIN 1310 are what is called a content parameter, i.e. a physicochemical parameter for quantitative description of the composition of mixtures of matter/mixed phases.

Preferably, the exfoliated sheet silicate platelets in the nanocomposite of the invention have an aspect ratio of more than 50, preferably of more than 70, even more preferably of more than 80 and especially preferably of more than 90, where the aspect ratio is the ratio of the longitudinal extent of a nanocomposite particle to its thickness and the parameters of particle length and particle thickness required for the calculation of the aspect ratio—within the context of the present invention—are obtained by means of dynamic light scattering—DLS—and by image analysis applying the standards ISO 13321 and ISO 22412.

Preferably, the sheet silicate platelets in the nanocomposites of the invention have an exfoliation level to be determined by x-ray diffraction in the range from 30% to 99%, more preferably an exfoliation level in the range from 50% to 95%, especially preferably in the range from 70% to 90%. The particle surface area of the sheet silicate in the nanocomposites of the invention is thus significantly greater than the particle surface areas of the sheet silicates in nanocomposites, as achievable by prior art processes.

In general, the person skilled in the art will refer to an aqueous suspension of a rubber as a latex. Apart from the latex to be used as reactant in process step b), the term "latex" alternatively refers to the process product from process step e), namely an aqueous suspension of nanocomposite of the invention.

Preferably, an aqueous suspension of nanocomposites of the invention obtainable from process step e) has a solids concentration in the range from 0.1% to 6% by weight. By way of clarification, it should be noted here that a solids concentration of 6% by weight of nanocomposite of the invention in a latex of the invention corresponds to about 15% by volume. The present invention therefore also relates to latex comprising at least one nanocomposite of the invention, preferably in a concentration in the range from 0.1% to 6% by weight.

The nanocomposites of the invention are processed further in at least one further process step by introduction into at least one rubber to give products, preferably rubber mixtures and vulcanizates. The present invention therefore also products, preferably in the form of rubber mixtures and vulcanizates, comprising at least one rubber and at least one nanocomposite of the invention.

The present invention finally provides for the use of the nanocomposites of the invention, preferably as a constituent of rubber mixtures or vulcanizates, for sealing of vessels and to counteract the escape of liquid media and/or gaseous media, preferably in the chemical industry, the domestic appliance industry or the motor vehicle industry, more preferably as gaskets, membranes, gas pressure accumulators, hoses, housings for motors, pumps and electrically operated tools, rollers, tires, couplings, stop buffers, conveyor belts, drive belts, multilayer laminates and multilayer films, and also sound- or vibration-dampening components.

BRIEF DESCRIPTION OF THE DRAWINGS

The invention will now be described in greater detail with reference to the drawings, wherein.

PREFERRED EMBODIMENTS OF THE INVENTION

Figure 1:
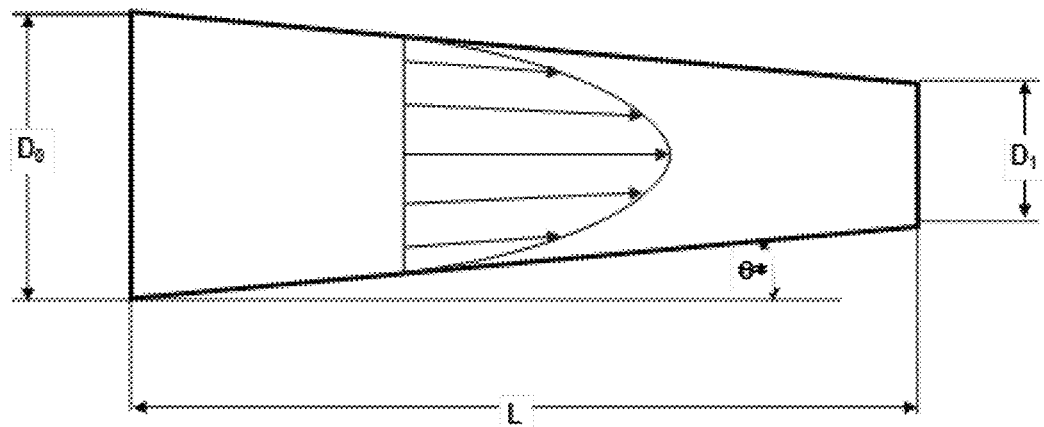
FIG. 1 is a schematic illustrating one embodiment of a flow reactor having the configuration of a conically tapering tube.

In process step a), a raw material in which there are sheet silicates wherein the silicate platelets are bonded to one another is used. Typically, this bonding of the silicate platelets to one another is based on chemical and/or electrical bonds. This raw material in process step a) is introduced into an aqueous medium, which opens up the silicate platelets. Sheet silicates having such opened-up silicate platelets are also referred to in the context of this application as intercalate.

Preferably, the aqueous medium is free of organic components, more preferably free of organic solvents or organic solubilizers, especially free of alcohols, ketones and/or other organic media commonly used as solvents.

Preferably, in process step a), the process of opening-up, also referred to as swelling, takes place in a stirred vessel, preferably in a stirred tank.

Preferably, process step a) is conducted at temperatures in the range from 0 to 95° C., more preferably in the range from 5 to 80° C., even more preferably in the range from 10 to 60° C., especially preferably in the range from 20 to 50° C.

Preferably, process step a) is conducted under standard pressure.

Preference is given to using demineralized water for the swelling in process step a). Demineralized water in the context of the invention has a conductivity in the range from 0.1 to 0.5 µS/cm.

Preferably, in process step a), the sheet silicate is used in amounts in the range from 1% to 35% by volume/1 liter of water, more preferably in amounts in the range from 5% to 25% by volume/1 liter of water, even more preferably in amounts of 4% to 15% by volume/1 liter of water.

Preferably, process step a) is conducted in a stirred tank connected upstream of the flow reactor, more preferably in a heatable stirred tank.

Preferably, the stirred vessel is under a pressure that can typically be established for production purposes, preferably a pressure in the range from 1 to 6 bar, in order to feed the semifinished product of opened-up sheet silicates in aqueous medium to a flow reactor that serves as mixing zone in process step b).

Independently of this, the other reactant, the latex, is likewise in a vessel which is preferably stirred. This second vessel is likewise preferably under a pressure that can be established in a suitable manner for production purposes, preferably under a pressure in the range from 1 to 6 bar.

Preferably, the latex to be used as reactant comprises at least one emulsifier from the group of sodium dodecylsulfate (SDS), sodium dodecylbenzylsulfonate (SDBS), potassium oleate, ammonium oleate, sodium stearate, ammonium stearate, ammonium myristinate [saturated ammonium fatty acid of $C_{10}$ to $C_{22}$] and unsaturated carboxylates having hydrocarbon chain lengths in the range from $C_{10}$ to $C_{22}$.

Particular preference is given to using sodium stearate as emulsifier in the latex.

In a further embodiment, combinations of the emulsifiers mentioned are also usable.

In process step b), the semifinished product obtainable from process step a) in the form of opened-up sheet silicates, also referred to as intercalate, in aqueous medium—also referred to hereinafter collectively as medium A)—is combined and mixed with the latex—referred to hereinafter as medium B)—to be used as reactant.

In the course of this, the rubber from medium B penetrates into the interstices of the sheets of the silicate platelets. This loosens bonds in the sheet silicate or between the silicate platelets and increases the distances between the sheets of the silicate platelets.

Preferably, the mixing in process step b) is effected in a mixing chamber connected upstream of the flow reactor.

Preferably, process step b) is conducted at temperatures in the range from 0 to 95° C., more preferably within a range from 5 to 80° C., even more preferably within a range from 10 to 60° C., especially preferably within a range from 20 to 50° C. Especially preferably, process step b) is conducted at room temperature within the range of 23+/−2° C.

Preferably, process step b) is conducted under standard pressure.

Preferably, in process step b), the sheet silicate and the latex to be used as reactant are mixed with one another in the ratio to be established in order to obtain, after the coagulation and workup, a sheet silicate content in the rubber matrix of up to 6% by volume. More preferably, the sheet silica content in the rubber matrix is ultimately in the range from 1% to 3% by volume. The dispersion of opened-up sheet silicate and latex to be used as reactant—i.e. the mixture of medium A) and medium B)—is preferably stirred so as to avoid settling of the constituents out of the dispersion.

In process step c), the mixture which has been obtained in step b) by mixing medium A) and B) is fed to a flow reactor, where the mixture is converted to a laminar extensional flow. In the course of this, the silicate platelets in the intercalate that have already been opened up are separated even further from one another.

The feed into the flow reactor is preferably at a pressure in the range from 1 to 6 bar.

The temperature in process step c) is preferably in the range from 0 to 95° C., more preferably in the range from 5 to 80° C., even more preferably in the range from 10 to 60° C., especially preferably in the range from 20 to 50° C.

The flow rate within the flow reactor is within the range of laminar flows which is characterized by the Reynolds number, and this in turn depends on the tubular cross section of the flow reactor.

Laminar flow is a movement of liquid and gases in which there is (still) no occurrence of visible turbulence (vortexing/crossflow): the fluid flows in layers that do not mix with one another. In this case, the flow (at constant flow rate) is usually a stationary flow. The opposite of a laminar flow is what is called turbulent flow. The physicist O. Reynolds found that vortexing in a pipeline only occurs over and above a particular flow rate. The assessment criteria employed for this purpose is the Reynolds number $R_e$. This is defined as follows:

$$Re = \frac{\rho \cdot v \cdot d}{\eta} = \frac{v \cdot d}{v} \tag{1}$$

where $v$ is the magnitude of a characteristic flow rate, l is a characteristic length and $v$ is the kinematic viscosity, $\eta$ the dynamic viscosity and $\rho$ the density of the flowing fluid.

Over and above a critical value $Re_{crit}$, the laminar flow becomes unstable to minor disruptions. This value, for example in the case of tubular flow, is about $$Re_{crit} = \frac{v_m \cdot d}{v} \approx 2320 \tag{2}$$

where $v_m$ is the mean flow rate, and the pipeline diameter d is to be employed as the characteristic length.

If the flow in a pipe is laminar, the Hagen-Poiseuille law is applicable. It describes the volume flow rate dV/dt through the pipe as a function of the inner radius of the pipe to be used.

In the separation of the opened-up sheet silicate platelets that takes place in the flow reactor, also referred to as exfoliation, the target in accordance with the invention is preferably an aspect ratio in the range from 100 to 200.

Preferably, the flow reactor has the configuration of a conically tapering tube, preferably of a tube according to FIG. 1. This converts the mixture of medium A) and medium B) to a laminar extensional flow. Preferably, the conversion to a laminar extensional flow is effected at low pressure, preferably at a pressure in the range from 0.2 to 30 bar, more preferably in the range from 0.5 to 20 bar and especially preferably in the range from 1 to 6 bar.

A conically tapering tube according to FIG. 1 for use with preference as flow reactor preferably has an angle $\theta'$ in the range from 1 to 15, more preferably in the range from 1 to 10°, more preferably an angle $\theta^*$ in the range from 1 to 5', where the angle $\theta^*$ indicates the slope angle of the reactor (see FIG. 1). In FIG. 1, $D_0$ is the diameter of the conically tapering tube on commencement of the onset of extensional flow and $D_1$ is the diameter prior to entry of the extensional flow into the mixing nozzle or precipitation nozzle and L is the length of the conically tapering tube.

The narrowing factor $D_0/D_1$ of the conically tapering tube for use with preference as flow reactor in process step c) is preferably in the range from 1.1 to 20, more preferably in the range from 2.5 to 18, even more preferably in the range from 5 to 15, especially in the range of 10+/−2, where $D_0$ is the cross section of the conically tapering tube on commencement of the onset of extensional flow and $D_1$ is the cross section of the conically tapering tube prior to entry of the extensional flow into the at least one mixing unit, preferably mixing nozzle or precipitation nozzle.

A preferred technical embodiment of the conically tapering tube produces an approximately hyperbolic profile over the length L in the laminar extensional flow. This can be achieved in that a grade reduces the tube cross section in steps of 5-25% of L, preferably of 7-18% of L, more preferably of 10-15% of L, i.e. in multiple distances <L. This narrowing is executed in such a way that the desired extensional flow is maintained.

A particularly preferred technical execution uses a smooth hyperbolic profile in the laminar extensional flow without grades in the flow reactor, since what are called eddies at the grades are avoided in this way and the desired extensional flow is maintained at higher throughputs.

The ratio $L/D_1$ is preferably in the range from 100 to 400, more preferably in the range from 150 to 300, especially preferably in the range of 250+/−10, which makes the extensional flow particularly homogeneous. The throughput is guided by the size of the batches and the amounts of liquid to be handled. Doubling of the tube diameter of the conically tapering tube to be used as flow reactor leads to a quadratic increase in the throughput.

In process step d), the silicate platelets surrounded by rubber from the latex to be used as reactant in process step b) that have been individualized in process step c) and are in extensional flow are admixed and mixed with a coagulant/precipitant based on at least one acid or at least one salt in at least one mixing unit. Preferably, this is at least one aqueous acid or an aqueous solution of at least one salt. The addition of the coagulant results in precipitation of the nanocomposites of the invention. This mixing operation in process step d) can be effected either still in the region of the last third before exit from the flow reactor, i.e. still within the flow reactor, or immediately after exit from the flow reactor.

The mixing unit required for this purpose is preferably embodied by at least one mixing nozzle or precipitation nozzle. According to the design of the mixing nozzle, the precipitation itself proceeds in two variants. In variant 1, precipitation proceeds already within the mixing nozzle. In variant 2, precipitation proceeds immediately downstream of or outside the mixing nozzle. In order that the precipitation does not take place until it is outside, for a desired precipitation rate at a given flow rate, the design length of the mixing nozzle has to be chosen such that the material has left the mixing nozzle before it coagulates. In the case of the mixing nozzles from Düsen-Schlick GmbH, Untersiemau/Coburg, that are to be used with preference, by virtue of the design, coagulation always takes place in the liquid film after it has left the mixing nozzle.

Preferably, at least one mixing nozzle is used for the coagulation step, which works either by the external mixing principle or by the internal mixing principle, preferably by the internal mixing principle. Two-fluid control spray valves according to the external mixing principle that can be used as mixing nozzles are known, for example, from DE 3709956 A1. Mixing nozzles according to the internal mixing principle that can be used as two-phase atomizer devices are known, for example, from DE 19820432 A1.

In the coagulation step, the precipitation conditions such as pressure, length of the precipitation nozzle, concentration of the coagulant and precipitation rate of the rubber in the latex used, which may be deliberately destabilized in one embodiment, have to be matched individually to the rubber type for use in each case. The aim is the formation of a nanocomposite with precipitation of the rubber onto the individualized sheet silicate platelets and the coverage of the surface thereof, which fixes the individualization of the silicate platelets. Only in this way is optimal homogeneity of the nanocomposites of the invention achieved.

In a preferred embodiment, the flow reactor has a modular construction, with generation of extensional flow in elements with a conical bore and integration of the at least one mixing unit for the addition of the coagulant into the flow reactor. Tube elements of different length permit a variable process length beyond the at least one mixing unit.

The ratio of the diameter $D_1$, the cross section of the flow crude reactor prior to entry of the extensional flow into the at least one mixing unit and the pressure p applied is used to control the extensional flow, the throughput and the volume flow rates in the mixing unit for the coagulation. Preference is given to observing a $D_1/p$ ratio in the range of 10-20/1-2, more preferably in the range of 12-18/1.25-1.75, most preferably a ratio of 15/1.5. By combination of the components, the geometry remains variable within wide limits, in order to be able to react to changes in the rheological properties of the suspension in the laminar extensional flow.

In one embodiment, preference is given to using a mixing nozzle in which the coagulant is added by the internal mixing principle at right angles or obliquely relative to the laminar extensional flow in the flow reactor or after exit from the flow reactor. For example, the Schlick model 770 mixing nozzle works by the principle of internal mixing; for example, the Schlick model 772 mixing nozzle works by the principle of external mixing. Alternative mixing nozzles that are likewise usable as mixing unit are Schlick model 803-804 mixing nozzles (see Schlick product brochure at http://www.duesen-schlick.de/industriewelt/418/druckduesen).

Most preferably, in process step c), the mixture which comprises media A) and B) and is in extensional flow with the coagulant is effected by the principle of internal mixing in which the feed of the coagulant in the mixing nozzle is effected at three points and at a separation of 120° in each case. Especially preferably, in this case, the three substreams of the coagulant are added in the same cross section of the mixing nozzle of the extensional flow composed of medium A) and B), which is referred to in the context of the present invention as the CDLC ("continuous dynamic latex compounding") method.

The feed of the coagulant into the extensional flow comprising the mixture of medium A) and medium B) in the at least one mixing unit is preferably at a ratio of 1 part by volume of coagulant to 100 parts by volume of the mixture, more preferably 1 part by volume of coagulant to 50 parts by volume of the mixture, even more preferably 1 part by volume of coagulant to 20 parts by volume of the mixture, especially preferably 1 part coagulant to 10 parts by volume of the mixture.

Preferably, the at least one mixing unit, preferably mixing nozzle or precipitation nozzle, and the flow reactor consists of the same material, preferably typical production steels, brass, Hastelloy®, PTFE, PVC, tantalum or titanium. Particular preference is given to using flow reactor and mixing nozzle made from acid-resistant V2A or V4A steel. When concentrated acid is used as coagulant, preference is given to using Hastelloy®, especially Hastelloy® B or Hastelloy® C.

Aqueous acids for use with preference as coagulant are mono-, di- or tribasic inorganic acids, preferably hydrochloric acid, sulfuric acid or phosphoric acid or mixtures thereof. These are preferably used in concentration ranges in the range from 0.005 to 0.2 mol/liter, more preferably in the range from 0.01 to 0.1 mol/liter, especially preferably in the range from 0.02 to 0.09 mol/liter.

Salts for use with preference as coagulant are aqueous solutions of mono-, di- or trivalent salts, preferably NaCl, CaCl$_2$, MgCl$_2$, AlCl$_3$, Na$_2$CO$_3$, MgSO$_4$ or mixtures thereof. These salts are preferably used in a concentration in the range from 0.005 to 0.2 mol/liter, more preferably in the range from 0.01 to 0.1 mol/liter, especially preferably in the range from 0.02 to 0.09 mol/liter.

The coagulation in process step d) is preferably conducted at a pH in the range from 0.5 to 6.5, more preferably within a range from 1.0 to 5.5, even more preferably within a range from 1.5 to 5.0, especially preferably within a range from 2.0 to 5.0.

The pH range preferred in accordance with the invention is ascertained with the aid of the measurement of the coagulation kinetics prior to performance of the process. For this purpose, the turbidity is measured, in which a laser beam having a wavelength of 532 nm is sent through a cuvette containing diluted latex (1:100) in a turbidity measurement system. The injection of an acid to be used as coagulant in accordance with the invention into the cuvette within a few milliseconds (about 15 ms) with simultaneous mixing with a magnetic stirrer leads to turbidity of the diluted latex, first passing through the state of dispersion, then agglomeration, until coagulation. A photodiode behind the cuvette registers the change in the incident light intensity and the resultant change in voltage is recorded and evaluated with an oscilloscope (Tektronix DPO3014). By using acids in varying concentration, it is possible to determine a pH dependence of the latex system with regard to the coagulation rate. It is possible to proceed in an analogous manner in the case of the precipitant salts to be used as coagulant. For latices based on NBR or HNBR, particular preference is given to a pH in the range from 4 to 5.

More preferably, the mixing in the at least one mixing unit in process step d) is effected at temperatures in the region of room temperature (23° C.+/−2°). The upper temperature limit for the mixing operation, in the case of use of aqueous acids or aqueous solutions of salts, is fixed by the boiling point of the solvent to be used for the acids or salts, and in the case of water as solvent is fixed up to the boiling point of water.

The mixing operation in process step d) is preferably effected at pressures in the range up to 30 bar, particular preference being given to pressures in the range up to 5 bar.

In process step e), the intermediate obtained in process step d) is collected and isolated in an alkaline aqueous medium.

Preferably, the alkaline aqueous medium has a pH>7.5, more preferably a pH>8.0, even more preferably a pH>8.5. Preferably, the alkaline aqueous medium used is an aqueous NaOH solution. Preferably, the coagulate is then isolated in the form of the nanocomposite of the invention and washed with demineralized water until the pH is neutral.

Isolating in the context of the present invention preferably means the filtering of the coagulate out of the aqueous medium, washing to neutrality and drying of the nanocomposite.

The coagulate is preferably dried to constant weight at a temperature in the range from 30 to 70° C., more preferably in the range from 40 to 60° C., especially at 55° C. The drying is preferably effected in a drying oven. It is crucial for the drying that the bulk core temperature of the coagulate does not exceed 90° C.

Preferably, in the nanocomposite of the invention, the exfoliated sheet silicate in latex form has a contact area with the surrounding matrix of rubber in the range from 20 to 50 g/m$^3$. What s meant thereby is the contact surface area that exists at a chosen concentration between the exfoliated sheet silicate platelets and the surrounding rubber matrix.

The nanocomposites of the invention obtainable from process step e) are either stored as a masterbatch and used later in what is called a compounding process or processed further directly by the methods that are common knowledge to the person skilled in the art as a filler to give rubber compounds, and the latter are shaped and vulcanized by industrial standard methods by means of suitable equipment for the production of mixtures, preferably rollers, internal mixers or else mixing extruders or the like. In the context of the present invention, therefore, crosslinked rubber compounds are also referred to as vulcanizates.

A description of the standard mixture constituents, their tasks in the mixing process and in the subsequent vulcanization and for achievement of desired vulcanizate properties is described in James E. Mark, Burak Erman, Frederick R. Erich "Science and Technology of Rubber", p. 419-469, Academic Press San Diego (second edition 1994). A description of the rubber compounding including the machinery and processes that are standard in industry can be found in James L. White "Rubber Processing", p. 162 if, Carl Hanser Verlag Munich Vienna (1995). A comprehensive description can be found in Fritz Röthemeyer, Franz Sommer "Kautschuk Technologie" [Rubber Technology], Carl Hanser Verlag Munich Vienna (2nd edition 2006).

Reactants for the Nanocomposites
Sheet Silicate

In process step a), a raw material in which there are sheet silicates wherein the silicate platelets are bonded to give the sheet silicate is used. Typically, this composite is fixed and characterized by chemical and/or electrical bonds. In various cases, the term phyllosilicate is also used for sheet silicate. Sheet silicates are silicates wherein the silicate anions consist of layers of corner-linked SiO$_4$ tetrahedra. These layers or double layers are not joined to one another via further Si—O bonds to give frameworks.

Preference is given in accordance with the invention to using at least one sheet silicate of the smectite type. Particular preference is given to using at least one sheet silicate from the group of montmorillonite Na$_{0.33}$((Al$_{1.67}$Mg$_{0.33}$)(OH)$_2$(S$_{14}$O$_{10}$)), beidellite (Ca,Na)$_{0.3}$(Al(OH)$_2$(Al$_{0.5}$Si$_{3.5}$O$_{10}$)), nontronite Na$_{0.33}$(Fe$_2$(OH)$_2$(Al$_{0.33}$S$_{13.67}$O$_{10}$), saponite (Ca,Na)$_{0.33}$((Mg,Fe)$_3$(OH)$_2$(Al$_{0.33}$Si$_{3.67}$O$_{10}$)) and hectorite Na$_{0.33}$((Mg,Li)$_3$(OH,F)$_2$(Si$_4$O$_{10}$)). Very particular preference is given to using montmorillonite (MMT) [CAS No. 1318-93-0]. MMT is a commonly occurring sheet silicate that crystallizes in the monoclinic crystal system and evolves only microscopically small, needle-like crystals that usually form compact, bulky aggregates. In pure form, MMT is white. Through extraneous additions, MMT may also be yellowish to reddish, greenish or bluish in color. However, the streak color is always white. MMT is a clay mineral and is the most important constituent (60-80%) of bentonite, and for that reason it is also possible to use bentonite as reactant in accordance with the invention.

Preferably, the sheet silicates to be used as raw material are in a stack agglomerate and, in the condition supplied, have a median particle size d$_{50}$ of about 10 μm.

Preferably, the shear strength of the sheet silicate, preferably MMT, for use in accordance with the invention in process step a), is in the range from 50 to 100 MPa. The shear strength is the resistance that a solid body offers to tangential shear forces. It indicates the maximum shear stress to which a body can be subjected before shearing off, i.e. the tangential force based on the fracture area. According to http://de.wikipedia.org/wiklScherfestlgkelt, the shear strength is determined in the laboratory by at least one of the methods and test apparatuses ("shear apparatuses") specified hereinafter triaxial apparatus (cf. DIN 18137-2; by contrast with mono- or biaxial pressure tests in material testing)
direct shear tests according to DIN 18137-3:
  box or frame shear apparatus
  ring shear apparatus
vane shear apparatus Shear strength can also be determined or derived in situ (on site), for example by the following testing methods:
vane shear tests according to DIN 4094-4
cone penetration tests according to DIN 4094-1
large apparatuses such as the Phicometer shear apparatus
small apparatuses such as the shear pressure cylinder.

By hydrolysis, the stack agglomerates of the sheet silicate are first swollen and ultimately broken up. The result is individual layers of the sheet silicate in aqueous suspension. Preferably, in process step a), hydrolysis is effected until the individual layers of the sheet silicate have an aspect ratio in the range from about 100 to 200.

MMT used with preference as reactant, after hydrolysis in process step a), preferably has a specific BET surface area in the range from 300 to 800 $m^2/g$. For the BET measurement, different measuring apparatuses are used, usually multipoint BET apparatuses as opposed to the single-point BET apparatuses that are afflicted with a systematic error. This is described in detail in the standards DIN-ISO 9277, or the previously applicable DIN 66131. A gas, frequently nitrogen, is passed through the material to be examined in BET analyses. Owing to the cooling, usually by liquid nitrogen (−196° C.), it is possible to use a standard pressure manometer to determine the amount absorbed below the saturation vapor pressure of the measurement gas (adsorption). Condensation would distort the measurement result, but does not take place provided that the saturation vapor pressure is not attained. Subsequent reduction of the pressure within the apparatus releases a portion of the amount of gas adsorbed from the surface (desorption). In this way, it is possible to determine an adsorption-desorption isotherm. In particular pressure ranges (often in the relative pressure range of 0.05-0.3, which should therefore also be measured completely, for example, with 5 measurement points), the measured amount of gas adsorbed or released is proportional to the surface area. In this regard see: Pure & Applied Chemistry, 57 (1985) 603-619.

MMT to be used with preference in accordance with the invention can be sourced, for example, from Southern Clay Products (trade name: Na-cloisite, USA) or as Cloisite® 93A from Rockwood Clay Additives GmbH.

According to the invention, the sheet silicate layers of the phyllosilicate, especially of the MMT, are opened up in process step a) through use of water. Preferably, the opening-up is effected without the additional use of organic solvents. Preferably, the sheet silicates are used in the range from 0.05% to 20% by volume, preferably in the range from 0.1% to 10% by volume, even more preferably in the range from 1% to 5% by volume, more preferably in the range from 1.5% to 4% by volume, in water.

Preferably, process step a) is conducted at a temperature in the range from room temperature (23° C.+/−2° C.) to 60° C. Preferably, process step a) is effected at a pressure in the range from 1.5 to 30 bar, more preferably in the range from 2.0 to 20 bar, even more preferably in the range from 3.0 to 10 bar and especially preferably in the range from 4.0 to 6.5 bar. Preference is given to using demineralized water. At the end of process step a), the sheet silicate is in the form of a homogeneous suspension.

Latex

Latex in the context of the present invention is generally an aqueous suspension of rubber. According to the invention, at least one latex is used in process step b). According to the invention, the process product according to process step d) or e) is also a latex.

The abbreviations used in the context of this application for the various rubber types are laid down in ISO 1043 (1975).

According to the invention, in process step b), at least one latex based on at least one rubber from the group of natural rubber (NR), ethylene-propylene-diene rubbers (EPDM), styrene/diolefin rubbers, polychloroprenes (CR), polybutadiene rubbers (BR), polyisoprene rubbers (IR), butyl rubbers, halobutyl rubbers, nitrile rubbers (NBR), carboxylated nitrile rubbers (XNBR), hydrogenated nitrile rubbers (HNBR) and carboxylated hydrogenated nitrile rubbers (HXNBR) is used.

A styrene/diolefin rubber preferred in accordance with the invention is styrene/butadiene rubber (SBR), especially E-SBR.

A butyl rubber preferred in accordance with the invention is isobutene/isoprene rubber (IIR).

Preferred halobutyl rubbers are chloro- or bromobutyl rubber (XIIR).

Particular preference is given to using, for the latex for use in accordance with the invention, at least one rubber from the group of NR, NBR, XNBR, SBR and BR.

If it is possible to obtain rubbers from more than one synthesis route, for example from emulsion or from solution, all options are always meant within the context of this application. The aforementioned rubbers are sufficiently well known to those skilled in the art and are commercially available from a wide variety of different suppliers.

In addition, it is also possible to use mixtures of two or more of the aforementioned rubbers as latex in process step b). These mixtures are also referred to as polymer blends of rubbers or as rubber blends (J. Schnetger "Lexikon der Kautschuktechnik" [Lexicon of Rubber Technology] 3rd edition, Hüthig Verlag Heidelberg, 2004, pages 375 to 377). Rubber blends for use with preference as latex are mixtures of NR as matrix phase and BR as dispersed rubber phase with BR contents up to 50 phr and of BR as matrix phase and SBR or CR as dispersed rubber phase with SBR or CR contents up to 50 phr.

In one embodiment, especial preference is given in accordance with the invention to using at least natural rubber (NR) as latex in process step b).

Natural rubber (NR) [CAS No. 9006-04-6] in chemical terms is a polyisoprene having a cis-1,4 content of >99% with average molecular weights of $2 \cdot 10^6$ to $3 \cdot 10^7$ g/mol. NR is synthesized by a biochemical route, preferably in the plantation crop Hevea Brasiliensis. Natural rubbers are commercially available, for example, as products from the SMR product series (Standard Malaysian Rubber) from Pacidunia Sdn. Bhd. or from the SVR product series (Standard Vietnamese Rubber) from Phu An Imexco. Ltd. (J. Schnetger "Lexikon der Kautschuktechnik" 3rd edition, Hüthig Verlag Heidelberg, 2004, pages 331 to 338).

Chloroprene rubbers [CAS No. 126-99-8], also called polychloroprenes or chlorobutadiene rubber, are synthetic rubbers that are used in automobile construction and for insulating sports clothing inter alia. In German-speaking countries, these are known by the name Neoprene®. Neoprene® is a brand belonging to DuPont; an example of a trade name of another manufacturer is Baypren from Lanxess Deutschland GmbH. The preparation is effected by polymerizing 2-chloro-1,3-butadiene (chloroprene) alone, or by copolymerization of chloroprene with dichlorobutadiene. The abbreviation according to ISO 1043 (1975) for chloroprene rubbers is CR.

In an alternative preferred embodiment, EPDM rubbers are used in the latex for process step b). EPDM [CAS No. 25038-36-2] comprises polymers which are prepared by terpolymerization of ethylene and propylene, and also a few % by weight of a third monomer having diene structure. The diene monomer provides the double bonds for the vulcanization that follows. Diene monomers used are predominantly cis,cis-1,5-cyclooctadiene (COD), exo-dicyclopentadiene (DCP), endo-dicyclopentadiene (EDCP), 1,4-hexadiene (HX), 5-ethylidene-2-norbornene (ENB) and also vinylnorbornene (VNB).

The reaction of ethylene with propylene and the diene monomer is typically effected in the presence of Ziegler-Natta catalyst systems, especially vanadium compounds with organoaluminum cocatalysts, or metallocene catalyst systems (J. Schnetger "Lexikon der Kautschuktechnik" 3rd edition, Hüthig Verlag Heidelberg, 2004, pages 144 to 146). In general, a mixture of more than 25% by weight of ethene, more than 25% by weight of propene and 1% to 10% by weight, preferably 1% to 3% by weight, of a nonconjugated diene is polymerized. Preferred dienes are bcyclo[2.2.1] heptadiene, 1,5-hexadiene, 1,4-dicyclopentadiene, 5-ethylidenenorbornene or vinylnorbornene (VNB) EPDM rubbers are available, for example, under the Keltan® brand from Lanxess Deutschland GmbH.

In an alternative preferred embodiment, SBR (vinylaromatic/diene rubber) [CAS No. 9003-55-8] is used latex for process step b). SBR rubbers are understood to mean rubbers based on vinylaromatics and dienes, specifically either solution SBR rubbers, abbreviated to "S-SBR", or emulsion SBR rubbers, abbreviated to "E-SBR".

S-SBR is understood to mean rubbers which are produced in a solution process based on vinylaromatics and dienes, preferably conjugated dienes (H. L. Hsieh, R. P. Quirk, Marcel Dekker Inc. New York-Basle 1996; I. Franta Elastomers and Rubber Compounding Materials; Elsevier 1989, pages 73-74, 92-94; Houben-Weyl, Methoden der Organischen Chemie, Thieme Verlag, Stuttgart, 1987, volume E 20, pages 114 to 134; Ullmann's Encyclopedia of Industrial Chemistry, vol. A 23, Rubber 3. Synthetic, VCH Verlagsgesellschaft mbH, D-69451 Weinheim, 1993, p. 240-364).

Preferred vinylaromatic monomers are styrene, o-, m- and p-methylstyrene, technical methylstyrene mixtures, p-tert-butyistyrene, α-methylstyrene, p-methoxystyrene, vinylnaphthalene, divinylbenzene, trivinylbenzene or divinylnaphthalene. Particular preference is given to styrene. The content of copolymerized vinylaromatic is preferably in the range from 5% to 50% by weight, more preferably in the range from 10% to 40% by weight.

Preferred diolefins are 1,3-butadiene, isoprene, 1,3-pentadiene, 2,3-dimethylbutadiene, 1-phenyl-1,3-butadiene or 1,3-hexadiene. Particular preference is given to 1,3-butadiene or isoprene. The content of copolymerized dienes is preferably in the range from 50% to 95% by mass, more preferably in the range from 60% to 90% by mass. The content of vinyl groups in the copolymerized diene is preferably in the range of 10 to 90% by mass, the content of 1,4-trans double bonds is preferably in the range of 20 to 80% by mass, and the content of 1,4-cis double bonds is complementary to the sum of vinyl groups and 1,4-trans double bonds. The vinyl content of the L-SBR is preferably >20% by mass.

The polymerized monomers and the different diene configurations are typically distributed randomly in the polymer. According to the invention, rubbers having a blockwise structure, which are referred to as integral rubber, are also covered by the definition of L-SBR (A) (K.-H. Nordsiek, K.-H. Kiepert, GAK Kautschuk Gummi Kunststoffe 33 (1980), no. 4, 251-255).

S-SBR shall be understood to mean both linear and branched or end group-modified rubbers. For example, such types are specified in DE 2 034 989 A1. The branching agent used is preferably silicon tetrachloride or tin tetrachloride.

These vinylaromatic/diene rubbers are produced especially by anionic solution polymerization, i.e. by means of an alkali metal- or alkaline earth metal-based catalyst in an organic solvent.

The solution-polymerized vinylaromatic/diene rubbers preferably have Mooney viscosities (ML 1+4 at 100° C.) in the range of 20 to 150 Mooney units, more preferably in the range of 30 to 100 Mooney units. Oil-free S-SBR rubbers preferably have glass transition temperatures in the range of −80° C. to +20° C., determined by differential thermoanalysis (DSC). "Oil-free" in the context of the present invention means that no oil has been mixed into the rubber in the production process.

E-SBR is understood to mean rubbers which are produced in an emulsion process based on vinylaromatics and dienes, preferably conjugated dienes, and optionally further monomers (Ullmann's Encyclopedia of Industrial Chemistry, vol. A 23, Rubber 3. Synthetic, VCH Verlagsgesellschaft mbH, D-69451 Weinheim, 1993, p. 247-251). Preferred vinylaromatics are styrene, p-methylstyrene or alpha-methylstyrene. Preferred dienes are especially butadiene or isoprene. Preferred further monomers are especially acrylonitrile. The content of copolymerized vinylaromatic is preferably in the range from 10% to 60% by mass. The glass transition temperature is preferably in the range from −50° C. to +20° C. (determined by means of DSC) and the Mooney viscosities (ML 1+4 at 100° C.) are preferably in the range from 20 to 150 MU (Mooney units). Especially the high molecular weight E-SBR types having Mooney units of >80 MU may preferably contain oils in amounts of 30 to 100 parts by weight based on 100 parts by mass of rubber. Oil-free E-SBR rubbers preferably have glass transition temperatures in the range of −70° C. to +20° C., determined by differential thermoanalysis (DSC).

Both E-SBR and S-SBR can be used in oil-extended form. "Oil-extended" in the context of the present invention means that oils have been mixed into the rubber in the production process. The oils serve as plasticizers. The oils that are customary in industry and are known to those skilled in the art are employed here. Preference is given to those containing a low level, if any, of polyaromatic hydrocarbons. TDAE (treated distillate aromatic extract), MES (mild extraction solvate) and naphthenic oils are particularly suitable.

In an alternative preferred embodiment, polybutadiene (BR) [CAS No. 25038-44-2] is used in the latex for process step b). Polybutadiene (BR) comprises two different classes of polybutadiene in particular. The first class has a 1,4-cis content of at least 90% and is prepared with the aid of Ziegler/Natta catalysts based on transition metals. Preference is given to using catalyst systems based on Ti, Ni, Co and Nd (Houben-Weyl, Methoden der Organischen Chemie, Thieme Verlag, Stuttgart, 1987, volume E 20, pages 798 to 812; Ullmann's Encyclopedia of Industrial Chemistry, Vol A 23, Rubber 3. Synthetic, VCH Verlagsgesellschaft mbH, D-69451 Weinheim, 1993, p. 239-364). The glass transition temperature of these polybutadienes is preferably ≤−90° C. (determined by means of DSC).

The second polybutadiene class is prepared with lithium catalysts and preferably has vinyl contents in the range from 10% to 80%. The glass transition temperatures of these polybutadiene rubbers are preferably in the range from −90° C. to +20° C. (determined by means of DSC).

In an alternative preferred embodiment, polyisoprene (IR) is used in the latex for process step b). Polyisoprene (IR) typically has a 1,4-cis content of at least 70%. The term IR includes both synthetic 1,4-cis-polyisoprene [CAS No. 104389-31-3] and natural rubber (NR). IR is produced synthetically both by means of lithium catalysts and with the aid of Ziegler/Natta catalysts, preferably with titanium and neodymium catalysts (Houben-Weyl, Methoden der Organischen Chemie, Thieme Verlag, Stuttgart, 1987, volume E 20, pages 822 to 840; Ullmann's Encyclopedia of Industrial Chemistry, Vol. A 23, Rubber 3. Synthetic, VCH Verlagsgesellschaft mbH, D-69451 Weinheim, 1993, p. 239-364). Preference is given to using natural rubber. According to the invention, 3,4-polyisoprene, which preferably has glass transition temperatures in the range from −20 to +30° C., Is also covered by IR.

In an alternative preferred embodiment, nitrile rubber (NBR) is used in the latex for process step b). NBR [CAS No. 9003-18-3] is obtained by copolymerizing at least one α,β-unsaturated nitrile, preferably acrylonitrile, and at least one conjugated diene, preferably butadiene, preferably in mass ratios in the range from about 52:48 to 82:18. It is produced virtually exclusively in aqueous emulsion. The resulting emulsions are processed to give the solid rubber for use in the context of this invention (J. Schnetger "Lexikon der Kautschuktechnik" 3rd edition, Hüthig Verlag Heidelberg, 2004, pages 28-29).

In an alternative preferred embodiment, hydrogenated nitrile rubber (HNBR) is used in the latex for process step b). HNBR is produced via complete or partial hydrogenation of NBR, for example in nonaqueous solution using specific catalysts, preferably pyridine-cobalt complexes or rhodium, ruthenium, iridium or palladium complexes (J. Schnetger "Lexikon der Kautschuktechnik" 3rd edition, Hüthig Verlag Heidelberg, 2004, page 30).

In an alternative preferred embodiment, carboxylated butadiene/acrylonitrile rubber (XNBR) is used in the latex for process step b). XNBR is prepared via terpolymerization of butadiene, acrylonitrile and a termonomer containing carboxyl groups, preferably a carboxylic acid or a carboxylic ester, especially acrylic acid or methacrylic acid. The proportion of the termonomer containing carboxyl groups is preferably in the range from 1% to 10% by weight (F. Röthemeyer, F. Sommer "Kautschuktechnologie", 2nd revised edition, Carl Hanser Verlag Munich Vienna, 2006, page 112).

In an alternative preferred embodiment, butyl rubber (IIR), especially isobutene/isoprene rubber, is used in the latex for process step b). Butyl rubber is produced via a copolymerization of isoprene and isobutylene (J. Schnetger "Lexikon der Kautschuktechnik" 3rd edition, Hüthig Verlag Heidelberg, 2004, pages 69 to 71).

In an alternative preferred embodiment, halobutyl rubber (XIIR), especially chlorobutyl rubber (CIIR) or bromobutyl rubber (BIIR), is used in the latex for process step b). Chlorobutyl rubber (CIIR) [CAS No. 68081-82-3] is produced by introducing chlorine gas into a butyl rubber solution (J. Schnetger "Lexikon der Kautschuktechnik" 3rd edition, Hüthig Verlag Heidelberg, 2004, page 75). Bromobutyl rubber (BIIR) [CAS No. 308063-43-6] is produced by treating butyl rubber in solution with bromine (J. Schnetger "Lexikon der Kautschuktechnik" 3rd edition, Hüthig Verlag Heidelberg, 2004, pages 66 to 67).

Particular preference is given in accordance with the invention to using at least one rubber from the group of natural rubber (NR), ethylene-propylene-diene rubber (EPDM), styrene/diolefin rubber (SBR), carboxylated nitrile rubber (XNBR), nitrile rubber (NBR) or polybutadiene (BR) or mixtures of two or more of the aforementioned rubbers in the latex for process step b).

Especial preference is given to using at least one rubber from the group of natural rubber (NR), ethylene-propylene-diene rubber (EPDM), styrene/diolefin rubber (SBR), carboxylated nitrile rubber (XNBR) or polybutadiene (BR) or mixtures of two or more of the aforementioned rubbers in the latex for process step b).

In a very particularly preferred embodiment of the present invention, styrene/diolefin rubber (SBR) is used in the latex for process step b).

In a very particularly preferred embodiment of the present invention, nItrile rubber (NBR) is used in the latex for process step b).

In a very particularly preferred embodiment of the present invention, hydrogenated nitrile rubber (HNBR) is used in the latex for process step b).

In a very particularly preferred embodiment of the present invention, carboxylated nitrile rubber (XNBR) is used in the latex for process step b).

In a very particularly preferred embodiment of the present invention, butyl rubber (IIR), especially isobutene/isoprene rubber and halobutyl rubber, is used in the latex for process step b).

Especially preferably, nanocomposites composed of MMT and styrene/diolefin rubber (SBR) are obtained.

Especially preferably, nanocomposites composed of MMT and nitrile rubber (NBR) are present.

Especially preferably, nanocomposites composed of MMT and hydrogenated nitrile rubber (HNBR) are obtained.

Especially preferably, nanocomposites composed of MMT and carboxylated nitrile rubber (XNBR) are obtained.

Especially preferably, nanocomposites composed of MMT and butyl rubber (IIR), especially isobutene/isoprene rubber and halobutyl rubber, are obtained.

All rubbers obtainable from solution polymerization processes are either dissolved from the solid mass in a suitable solvent, admixed with aqueous emulsifier solutions and stirred, or admixed from what is called the cement with aqueous emulsifier solutions and stirred so as to form a secondary latex. As soon as this has been done, the process of the invention can also be applied to rubbers from solution polymerization processes as reactants for process step b).

More preferably, the present invention relates to nanocomposites composed of MMT particles which are encased by a rubber matrix and contain at least one MMT as sheet silicate and at least one rubber from the group of natural rubber, ethylene-propylene-diene rubbers, ethylene-vinyl acetate rubbers, ethylene-acrylate rubbers, acrylate rubbers, fluoro rubbers, styrene/diolefin rubbers, polychloroprenes, polybutadiene rubbers, polyisoprenes, butyl rubber, halobutyl rubbers, nitrile rubbers, carboxylated nitrile rubbers, hydrogenated nitrile rubbers and carboxylated hydrogenated nitrile rubbers, characterized in that the MMT content is ≤6% by volume and 50% of the MMT particles in the rubber matrix have a maximum median particle size $d_{50}$ in the range from 100 to 200 nm, wherein the particle size is determined by transmission electron microscopy according to ISO 29301.

Most preferably, the present invention relates to nanocomposites composed of MMT particles which are encased by a rubber matrix and contain at least one rubber from the group of NR, NBR, XNBR, SBR and BR, characterized in that the MMT content is ≤6% by volume and 50% of the MMT particles in the rubber matrix have a maximum median particle size $d_{50}$ in the range from 100 to 200 nm, wherein the particle size is determined by transmission electron microscopy according to ISO 29301.

More particularly, the present invention relates to nanocomposites composed of MMT particles encased by an NBR matrix, characterized in that the MMT content is ≤6% by volume and 50% of the MMT particles in the NBR matrix have a maximum median particle size d50 in the range from 100 to 200 nm, the particle size being determined by transmission electron microscopy according to ISO 29301.

More particularly, the present invention also relates to nanocomposites composed of MMT particles encased by an SBR matrix, characterized in that the MMT content is ≤6% by volume and 50% of the MMT particles in the SBR matrix have a maximum median particle size d50 in the range from 100 to 200 nm, the particle size being determined by transmission electron microscopy according to ISO 29301.

More particularly, the present invention also relates to nanocomposites composed of MMT particles encased by an NR matrix, characterized in that the MMT content is ≤6% by volume and 50% of the MMT particles in the NR matrix have a maximum median particle size d50 in the range from 100 to 200 nm, the particle size being determined by transmission electron microscopy according to ISO 29301.

More particularly, the present invention also relates to nanocomposites composed of MMT particles encased by an XHNBR matrix, characterized in that the MMT content is ≤6% by volume and 50% of the MMT particles in the XHNBR matrix have a maximum median particle size d50 in the range from 100 to 200 nm, the particle size being determined by transmission electron microscopy according to ISO 29301.

More particularly, the present invention also relates to nanocomposites composed of MMT particles encased by an XNBR matrix, characterized in that the MMT content is ≤6% by volume and 50% of the MMT particles in the XNBR matrix have a maximum median particle size d50 in the range from 100 to 200 nm, the particle size being determined by transmission electron microscopy according to ISO 29301.

More particularly, the present invention also relates to nanocomposites composed of MMT particles encased by a BR matrix, characterized in that the MMT content is ≤6% by volume and 50% of the MMT particles in the BR matrix have a maximum median particle size d50 in the range from 100 to 200 nm, the particle size being determined by transmission electron microscopy according to ISO 29301.

Products or Vulcanizates

The present invention finally also relates to products, preferably in the form of rubber mixtures or vulcanizates, comprising at least one rubber and at least one nanocomposite of the invention. The production of products with nanocomposites of the invention is effected by known methods for the rubber-processing industry as described, for example, in James E. Mark, Burak Erman, Frederick R. Erich "Science and Technology of Rubber", p. 419-469, Academic Press San Diego (second edition 1994. in James L. White "Rubber Processing", p. 162 ff, Carl Hanser Verlag Munich Vienna (1995) or else in Fritz Röthemeyer, Franz Sommer "Kautschuk Technologie", Carl Hanser Verlag Munich Vienna (2nd edition 2006).

Preferably, the content of nanocomposites of the invention in the products, preferably rubber mixtures or vulcanizates, is in the range from 0.1% to 10% by mass, more preferably in the range from 0.5% to 7% by mass, even more preferably in the range from 1.0% to 6% by mass, most preferably in the range from 1.5% to 4.5% by mass.

The nanocomposites of the invention, together with the further mixture constituents described above, enable novel material performance of the products produced in this way, preferably rubber mixtures and vulcanizates, which feature marked strengthening, a reduction in swelling in oils and fuels, and a reduction in the gas permeability of membranes and hoses, extending as far as elevated shielding from radiation.

Preferably, the rubbers used as base polymer in the products or vulcanizates of the invention are the same as used for the production of the nanocomposites of the invention in the latex for process step b). For production of products of the invention, therefore, the base polymer to be used is preferably at least one rubber to be selected from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIR, BIIR), nitrile rubbers (NBR), carboxylated nitrile rubbers (XNBR), hydrogenated nitrile rubbers (HNBR) and carboxylated hydrogenated nitrile rubbers (HXNBR).

Even though already individualized filers are being diluted in the identical base polymer, there is thus no agglomeration.

The present invention more preferably relates to products or vulcanizates comprising at least one form of nanocomposites composed of at least one sheet silicate and at least one rubber, in which the sheet silicate content is ≤6% by volume and 50% of the sheet silicate particles in the rubber matrix have a maximum median particle size d50 in the range from 100 to 200 nm, and the at least one rubber is selected from the group of natural rubber, ethylene-propylene-diene rubbers, ethylene-vinyl acetate rubbers, ethylene-acrylate rubbers, acrylate rubbers, fluoro rubbers, styrene/diolefin rubbers, polychloroprenes, polybutadiene rubbers, polyisoprenes, butyl rubber, halobutyl rubbers, nitrile rubbers, carboxylated nitrile rubbers, hydrogenated nitrile rubbers and carboxylated hydrogenated nitrile rubber, and the median particle size is determined by transmission electron microscopy according to ISO 29301.

The present invention more preferably relates to products or vulcanizates comprising at least one form of nanocomposites composed of at least one sheet silicate and at least one rubber, in which
- the MMT content is ≤6% by volume and
- 50% of the MMT particles in the rubber matrix have a maximum median particle size d50 in the range from 100 to 200 nm, wherein the particle size is determined by transmission electron microscopy according to ISO 29301 and in which both the rubber present in the nanocomposite and the at least one further rubber in the vulcanizate is selected from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIIR, BIIR), nitrile rubbers (NBR), hydrogenated nitrile rubbers (HNBR) and carboxylated butadiene and acrylonitrile rubbers (XNBR).

The present invention most preferably relates to products or vulcanizates comprising at least one form of nanocomposites composed of at least one sheet silicate and at least one rubber, in which
- the MMT content is ≤6% by volume and
- 50% of the MMT particles in the rubber matrix have a maximum median particle size d50 in the range from 100 to 200 nm, wherein the particle size is determined by transmission electron microscopy according to ISO 29301 and in which both the rubber present in the nanocomposite and the at least one further rubber in the vulcanizate is the same rubber from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIIR, BIIR), nitrile rubbers (NBR), hydrogenated nitrile rubbers (HNBR) and carboxylated butadiene/acrylonitrile rubbers (XNBR).

The present invention most preferably relates to products or vulcanizates comprising at least one form of nanocomposites composed of MMT and at least one rubber, in which
- the MMT content is ≤6% by volume and
- 50% of the MMT particles in the rubber matrix have a maximum median particle size d50 in the range from 100 to 200 nm, wherein the particle size is determined by transmission electron microscopy according to ISO 29301 and in which both the rubber present in the nanocomposite and the at least one further rubber in the vulcanizate is the same rubber from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIIR, BIIR), nitrile rubbers (NBR), hydrogenated nitrile rubbers (HNBR) and carboxylated butadiene/acrylonitrile rubbers (XNBR).

The present invention especially relates to products or vulcanizates comprising at least one form of nanocomposites composed of MMT and at least NBR, in which the
- MMT content is ≤6% by volume and
- 50% of the MMT particles in the rubber matrix have a maximum median particle size d50 in the range from 100 to 200 nm, wherein the particle size is determined by transmission electron microscopy according to ISO 29301 and in which the at least one further rubber in the vulcanizate is selected from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIIR, BIIR), nitrile rubbers (NBR), hydrogenated nitrile rubbers (HNBR) and carboxylated butadiene/acrylonitrile rubbers (XNBR).

The present invention especially relates to products or vulcanizates comprising at least one form of nanocomposites composed of MMT and at least SBR, in which
- the MMT content is ≤6% by volume and
- 50% of the MMT particles in the rubber matrix have a maximum median particle size d50 in the range from 100 to 200 nm, wherein the particle size is determined by transmission electron microscopy according to ISO 29301 and in which the at least one further rubber in the vulcanizate is selected from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIIR, BIIR), nitrile rubbers (NBR), hydrogenated nitrile rubbers (HNBR) and carboxylated butadiene/acrylonitrile rubbers (XNBR).

The present invention especially relates to products or vulcanizates comprising at least one form of nanocomposites composed of MMT and at least HNBR, in which
- the MMT content is ≤6% by volume and
- 50% of the MMT particles in the rubber matrix have a maximum median particle size d50 in the range from 100 to 200 nm, wherein the particle size is determined by transmission electron microscopy according to ISO 29301 and in which the at least one further rubber in the vulcanizate is selected from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIIR, BIIR), nitrile rubbers (NBR), hydrogenated nitrile rubbers (HNBR) and carboxylated butadiene/acrylonitrile rubbers (XNBR).

The present invention especially relates to products or vulcanizates comprising at least one form of nanocomposites composed of MMT and at least XNBR, in which
- the MMT content is ≤6% by volume and
- 50% of the MMT particles in the rubber matrix have a maximum median particle size d50 in the range from 100 to 200 nm, wherein the particle size is determined by transmission electron microscopy according to ISO 29301 in which the at least one further rubber in the vulcanizate is selected from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIIR, BIIR), nitrile rubbers (NBR), hydrogenated nitrile rubbers (HNBR) and carboxylated butadiene/acrylonitrile rubbers (XNBR).

The present invention especially relates to products or vulcanizates comprising at least one form of nanocomposites composed of MMT and at least IIR, especially isobutene/isoprene rubber and halobutyl rubber, in which
the MMT content is ≤6% by volume and
50% of the MMT particles in the rubber matrix have a maximum median particle size d50 in the range from 100 to 200 nm,
wherein the particle size s determined by transmission electron microscopy according to ISO 29301 and in which the at least one further rubber in the vulcanizate is selected from the group of natural rubber (NR), ethylene-propylene-diene rubbers (EPDM), ethylene-vinyl acetate rubbers (EVM), ethylene-acrylate rubbers (EAM), acrylate rubbers (ACM), fluoro rubbers (FKM), styrene/diolefin rubbers, polychloroprenes (CR), polybutadiene rubbers (BR), polyisoprenes (IR), butyl rubber (IIR), halobutyl rubbers (CIIR, BIIR), nitrile rubbers (NBR), hydrogenated nitrile rubbers (HNBR) and carboxylated butadiene/acrylonitrile rubbers (XNBR).

The present invention most preferably relates to products or vulcanizates comprising at least one form of nanocomposites composed of at least one sheet silicate and at least one rubber, in which
the MMT content is ≤6% by volume and
50% of the MMT particles in the rubber matrix have a maximum median particle size d50 in the range from 100 to 200 nm,
wherein the particle size is determined by transmission electron microscopy according to ISO 29301 in which the at least one rubber in the vulcanizate is selected from the group of NR, NBR, XNBR, SBR and BR.

The present invention most preferably relates to products or vulcanizates comprising at least one form of nanocomposites composed of at least one sheet silicate and at least one rubber, in which
the MMT content is ≤6% by volume and
50% of the MMT particles in the rubber matrix have a maximum median particle size d50 in the range from 100 to 200 nm,
wherein the particle size is determined by transmission electron microscopy according to ISO 29301 and in which both the rubber present in the nanocomposite and the at least one further rubber in the vulcanizate is the same rubber from the group of NR, NBR, XNBR, SBR and BR.

The present invention most preferably relates to products or vulcanizates comprising at least one form of nanocomposites composed of at least one sheet silicate and at least one rubber, in which
the MMT content is ≤6% by volume and
50% of the MMT particles in the rubber matrix have a maximum median particle size d50 in the range from 100 to 200 nm,
wherein the particle size is determined by transmission electron microscopy according to ISO 29301 and in which both the rubber present in the nanocomposite and the at least one further rubber in the vulcanizate is NR.

The present invention most preferably relates to products or vulcanizates comprising at least one form of nanocomposites composed of at least one sheet silicate and at least one rubber, in which
the MMT content is ≤6% by volume and
50% of the MMT particles in the rubber matrix have a maximum median particle size d50 in the range from 100 to 200 nm,
wherein the particle size is determined by transmission electron microscopy according to ISO 29301 and in which both the rubber present in the nanocomposite and the at least one further rubber in the vulcanizate is NBR.

The present invention most preferably relates to products or vulcanizates comprising at least one form of nanocomposites composed of at least one sheet silicate and at least one rubber, in which
the MMT content is ≤6% by volume and
50% of the MMT particles in the rubber matrix have a maximum median particle size d50 in the range from 100 to 200 nm,
wherein the particle size is determined by transmission electron microscopy according to ISO 29301 and in which both the rubber present in the nanocomposite and the at least one further rubber in the vulcanizate is XNBR.

The present invention most preferably relates to products or vulcanizates comprising at least one form of nanocomposites composed of at least one sheet silicate and at least one rubber, in which
the MMT content is ≤6% by volume and
50% of the MMT particles in the rubber matrix have a maximum median particle size d50 in the range from 100 to 200 nm,
wherein the particle size is determined by transmission electron microscopy according to ISO 29301 and in which both the rubber present in the nanocomposite and the at least one further rubber in the vulcanizate is SBR.

The present invention most preferably relates to products or vulcanizates comprising at least one form of nanocomposites composed of at least one sheet silicate and at least one rubber, in which
the MMT content is ≤6% by volume and
50% of the MMT particles in the rubber matrix have a maximum median particle size d50 in the range from 100 to 200 nm,
wherein the particle size is determined by transmission electron microscopy according to ISO 29301 and in which both the rubber present in the nanocomposite and the at least one further rubber in the vulcanizate is BR.

The production of products or vulcanizates of the invention is effected by mixing the components. The mixing can be effected here in one stage or in up to 6 stages. A two-stage mixing operation with one mixing stage in an internal mixer and a final mixing stage on a roller (called "ready-mixing stage") has been found to be useful. Another possibility is a two-stage mixing process wherein the 1st mixing stage is effected in an internal mixer with an ejection temperature of <130° C. and the 2nd mixing stage again in an internal mixer with an ejection temperature of <110° C.

Preference is given to the addition of an inventive nanocomposite-containing masterbatch completely in the first mixing step and to the addition of crosslinking chemicals in a second mixing step. Suitable aggregates for the mixture production are known to those skilled in the art and should preferably be selected from rollers, internal mixers and mixing extruders. In the case of employment of a two-stage mixing operation in an internal mixer or a three- or multi-stage mixing process, in the first and/or in the second and in later mixing stages, preferably temperatures in the range from 110° C. to 180° C. are employed, the mixing times at these temperatures preferably being in the range from 1 to 15 minutes and being selected such that vulcanization does not begin at this early stage (incipient vulcanization or scorch).

The temperatures in the ready-mixing stage are preferably in the range from 20 to 120° C., more preferably in the range from 30 to 110° C. Most preferably, the mixing in an internal mixer is effected at temperatures in the range from 20 to 180° C., especially at temperatures in the range from 50 to 170° C., or on a roller at less than 100° C., preferably at less than 80° C. and even more preferably at less than 60° C. The choice of a suitable temperature can be undertaken by the person skilled in the art on the basis of his or her specialist knowledge, ensuring that the mixing on the one hand results in adequate distribution of the nanocomposite in the masterbatch and on the other hand does not result in premature vulcanization (scorching).

The vulcanization for production of products or vulcanizates of the invention comprising nanocomposites of the invention is preferably ultimately effected at a temperature in the range from 100 to 250° C., more preferably in the range from 130 to 180° C., either under standard pressure (1 bar) or optionally at a pressure of up to 300 bar.

Nanocomposites of the invention can alternatively be used as additives in other polymers, preferably for improvement of properties of thermoplastic polymers, more preferably in polyamides, polyesters, polyalkylenes, polyurethanes, polycarbonates. They are preferably used where high integrities with respect to liquid and gaseous media are desired. The elastomer content of nanocomposites of the invention simultaneously acts as an elastifying additive in a thermoplastic.

The present invention also relates to the use of nanocomposites of the invention as a component in vulcanizable mixtures with at least one further rubber from which vulcanizates, preferably in the form of gaskets, are produced, which serve for sealing with respect to liquid or gaseous media.

Explosive Decompression

The invention further relates to the use of nanocomposites of the invention for improving the properties of vulcanizates in the event of explosive decompression, especially in the case of gaskets that are subjected to explosive decompression.

Explosive decompression (ED), also known as gas expansion fracture, is a major risk for any rubber gasket exposed to a high-pressure gas environment. When rubber gaskets of this kind serve to seal off gases, gas can become trapped in micropores of gaskets during operation. If the gasket faces are exposed to a shift in equilibrium—as in the event of rapid decompression—this trapped gas expands abruptly in the micropores of the rubber gasket in order to correspond to the external pressure. Intercalations of gas in cracks of gasket materials lead to blisters therein and ultimately to leaks.

The structural damage to gasket materials that occurs in the event of ED depends on the volume of gas trapped and the hardness of the gasket. Smaller amounts of gas are more likely to lead to superficial blisters that can disappear again after the pressure has been equalized. Larger amounts of trapped gas can cause deep cross-sectional fractures or even the complete destruction of a gasket. Higher temperatures catalyze this phenomenon.

One way of preventing explosive decompression is to enable decompression over prolonged periods of time. In this case, the trapped gas can leave the pores of the elastomer more slowly, which reduces the chances that damage will occur. Use of gasket materials of Shore A hardness more than 80 can likewise be helpful. This is because harder gaskets having a high shear modulus are of better suitability for dissipating the fracture energy that occurs in the event of explosive decompression if it spreads within the gasket. On the other hand, smaller gasket cross sections offer fewer ways for gas to become trapped.

The aim of the developments in the gasket industry is to develop novel rubber-based materials for gasket purposes that feature high hardnesses of 80 Shore A or more and hence especially withstand possible gap extrusion at high pressures, which prevents damage to gaskets resulting from explosive decompression.

The invention therefore provides for the use of nanocomposites of the invention for reduction or prevention of damage to rubber-based products or vulcanizates during explosive decompression.

Preferred rubber products or vulcanizates are gasket elements, preferably gasket elements in industrial plants in which there can be explosive decompression. These are preferably instrument systems of boreholes in mineral oil or gas exploration.

Preferred gasket elements are O-ring gaskets, D gaskets, T gaskets, V gaskets, X gaskets, flat gaskets, lip gaskets, support rings, bonded gaskets or packing elements.

The present invention also relates to a method of increasing the resistance of rubber-based products or vulcanizates in the event of a sudden pressure drop, by using nanocomposites of the invention in the production of the rubber for these products. Preference is given to using MMT-based composites obtainable by CDLC methods.

EXAMPLES

1. Materials Used:
1.1 Latices Used

The studies in the context of the present invention were conducted with products/vulcanizates based on the NBR, HXNBR and SBR rubber types from Lanxess Deutschland GmbH, Cologne, Germany, and with nanocomposites of the invention based on commercial montmorillonite (=MMT). These products were compared with products produced according to prior art EP 2 168 918 A1 (nanocomposites produced by mechanical mixing) and DE 10 2007 048 995 A1 (nanocomposites produced by flow reactor without mixing nozzle).

Products of the invention in the form of NBR and HXNBR vulcanizates, within the scope of the studies relating to the present invention, formed a representative variation in the ACN content and in the emulsifier systems. The rubbers underlying the products/vulcanizates had the properties listed in tab. 1.

TABLE 1

| Polymer | Trade name | ACN content [%] | COOH content [%] | Mooney viscosity ML (1 + 4)100° C. | Polymer density [g/cm$^3$] | Solids content [%] |
|---|---|---|---|---|---|---|
| NBR 1 | Perbunan ® 3445F | 34 | — | 45 MU | 0.97 | 18.2 +/− 0.2 |
| NBR 2 | Perbunan ® 3430F | 34 | — | 32 MU | 0.97 | 19.0 +/− 0.1 |

TABLE 1-continued

| Polymer | Trade name | ACN content [%] | COOH content [%] | Mooney viscosity ML (1 + 4)100° C. | Polymer density [g/cm³] | Solids content [%] |
|---------|------------|-----------------|------------------|------------------------------------|-------------------------|--------------------|
| NBR 3 | Krynac ® 4450F | 44 | — | 50 MU | 1.00 | 13.4 +/− 0.2 |
| HXNBR 1 | Therban ® XT VP | 34 | 5 | 39 MU | 0.95 | 39.1 +/− 0.2 |

1.1.1 Secondary Latex Based on S Rubbers was Produced by the Following Route:

Secondary latices based on S rubbers that are to be used for the products/vulcanizates of the invention were synthesized in the context of the present invention as follows: styrene-butadiene rubber (S-SBR: Buna® VSL 2525-0, Buna® VSL 5025-2 HM and Amino-S-SBR: Buna® VSL VP PBR 4057 and carboxylated Buna® VSL VP PBR 4088 RJ) and Lanxess Butyl 101-3, and Halobutyl Lanxess X_Butyl™ BB2030 were each dissolved in tert-butyl methyl ether (TBME) in a one-neck flask and while stirring with a CPG stirrer, so as to form a 10% by weight solution within 10 hours (CPG=core-pulled precision glass).

For the production of the secondary latex, an emulsifier solution (0.01 mol/L) in demineralized water was produced.

The emulsifiers that were each used separately in different mixtures were:
sodium dodecylsulfate SDS, sodium dodecylbenzylsulfonate SDBS, potassium oleate, ammonium oleate, sodium stearate, ammonium stearate, ammonium myristinate [saturated ammonium fatty acid of $C_{10}$ to $C_{22}$] and unsaturated carboxylates having hydrocarbon chain lengths of $C_{10}$ to $C_{22}$.

It was found by analytical means via dynamic light scattering that sodium stearate is preferable as emulsifier at the highest pH. The other emulsifiers were likewise usable alone or, if required, in combination.

The emulsifier solution (320 mL) was initially charged, and the SBR solution in TBME (600 mL) was gradually added by means of a Silverson LM5 laboratory mixer system. This was followed by an increase to 8000 rpm for about 2 min. The remaining TBME was removed from the resultant white, milky-turbid and foamy suspension by rotary evaporator, and the reemulsified latex was thus obtained.

1.2 Sheet Silicates Used

TABLE 2

| Sheet silicates used | | | |
|---|---|---|---|
| Trade name | Manufacturer | CEC | Layer separation |
| Na⁺Cloisite | Süd-Chemie AG | 92 meg/100 g | 1.17 nm |
| Nanofil ® 116 | Rockwood Clay Additives GmbH | 116 meg/100 g | 1.25 nm |
| PGN | Nanocor Inc. | 120 meg/100 g | 1.25 nm |
| PGW | Nanocor Inc. | 145 meg/100 g | 1.54 nm |
| PGV | Nanocor Inc. | 145 meg/100 g | 1.31 nm |

CEC stands for cation exchange capacity 1.3 Production of about 100 g of a Nanocomposite with 2% by Volume of Sheet Silicate According to Table 1

1. A 2 L multineck flask was charged with 5.21 g of PGN (Nanocor Inc.) in 300 mL of demineralized water. The sheet silicate was stirred at room temperature for about 16 h, so as to form a homogeneous suspension. (Process step a)

2. The suspension was added to 556 mL of latex of the rubbers according to tab. 1 (solids content 18%) and then the mixture was stirred at room temperature for 1.5 hours. (Process step b)

3. A dilute sulfuric acid solution was prepared with demineralized water with a concentration of 0.02 mol/L. This served in the process to precipitate the mixture of sheet silicate suspension in water (from 1.) and the particular latex according to tab. 1 (from 2.).

4. The mixture of latex (according to tab. 1) and sheet silicate suspension was introduced into a first pressure vessel. The dilute acid ("coagulant") was charged into a second pressure vessel. The feed of the coagulant from the reservoir vessel to the mixing nozzle was opened and the feed of the coagulant under pressure was adjusted using fine pressure regulators (e.g. 2 bar).

5. The taps of the pressure vessels were opened simultaneously, and the mixture of latex and sheet silicate suspension flowed through the flow reactor in extensional flow and met the coagulant in the mixing zone.

In the case of the process of the invention, the mixing unit used in the mixing zone was either a T-piece or an internal mixing nozzle of the Schlick 772 type, by means of which the coagulant was injected through three holes that had a separation from one another of 120°. At the outlet of the mixing nozzle, the coagulant was sprayed at different angles, such that the mixing of the mixture of NBR latex and sheet silicate suspension with the coagulant occurred outside the flow reactor. The coagulate obtained in this way was collected in an alkaline aqueous medium in the form of an NaOH solution having a pH>8, or alternatively>9 or >10.

For reworking of the process according to DE 10 2007 048 995 A1, a mixing unit downstream of the flow reactor was dispensed with. The reworking of the process according to EP 2 168 918 A1 in which the components were mixed by agitation was effected in the context of the present invention by mixing by means of a stirrer.

6. The coagulate was filtered, then washed with demineralized water and dried at 55° C.

7. The exact determination of the proportion of sheet silicate incorporated was made by means of thermogravimetric analysis according to ISO 9924-1 and ISO 9924-2 depending on the rubber used. A TGA 2950CE Hi-Res instrument from TA-Instruments was used with the following parameters:
Amount of sample: 10 mg +/−1.5 mg
Heating rate: 20 K/min from RT to 550° C. under $N_2$ atmosphere
Heating rate: 20 K/min from 550° C. to 750° C. under $O_2$ atmosphere The amount of sheet silicate is found from the mass balance with the starting weight.

1.4. Particle Size Measurement/Zeta Potential

For measurements on swollen sheet silicate/water systems (semifinished product according to process step a)), the systems were swelled in demineralized water for 16 h. 300 ml of demineralized water were added to the suspension in the measurement chamber, such that there was always a concentration of 10% by volume. In experiments with salts and acids, the corresponding solutions were initially charged in the measurement chamber and the pre-swollen sheet silicates were added in suspension. The measurements of the particle size of the sheet silicate in aqueous solution (semifinished product according to process step a)) were then effected by means of light scattering on a Sympatec instrument (HELOS/BR) at room temperature according to ISO Standard 13320. The pump output of the instrument in the measurements was 30% (1080 rpm). The cuvette size was 2 mm. The laser had a power of 5 mW and the wavelength used according to manufacturer data was 632.8 nm.

Further particle size measurements using dynamic light scattering—DLS—and determination of the zeta potential were conducted on an instrument from Malvern Instruments (Zetasizer Nano) employing the standards ISO 22412 and ISO 13321.

See: http://www.malvem.com/de/products/technology/dynamic-light-scattering/.

For the performance of particle size measurements, the reactants for use in process step b), firstly the latex and secondly the sheet silicate suspensions, were diluted in a ratio of 1:100 and introduced into a cuvette. The measurement temperature in the cell was 23° C. The particle size of the sheet silicate was measured three times by this method, in each case for the semifinished product from process step a) and after mixing with the latex according to process step b). The measurement time was 80 s per data point. The autocorrelation function was determined, and the similarity of the function over time was observed with the aid of the ALV-5000 software. This gave the diffusion coefficient D and, with the aid of the relationship $$R_H = kT/6\pi\eta D \quad (3),$$

the hydrodynamic radius $R_H$ was obtained. The zeta potential, which indicates the commencement of coagulation, was measured 50 times and the mean was formed. The zeta potential was determined as >−30 mV. The measurement time was 15 ms.

1.4. CDLC Method=Method Especially Preferred in Accordance with the Invention

A suspension of 5.3 g of sodium montmorillonite and 300 mL of demineralized water was swelled while stirring in a 2.0 liter laboratory stirred tank for 16 hours. The latices to be used according to tab. 1 were diluted to solids content 18%. 556 mL of the respective latex were stirred with the MMT suspension at room temperature for 1.5 hours. The latex/MMT suspension was charged to a first pressure vessel. A second pressure vessel was charged with the coagulant. The coagulant used was either a dilute sulfuric acid, a dilute hydrochloric acid or a salt solution of NaCl, $CaCl_2$ or $MgSO_4$. By applying pressure in the range from 0.5 to 5 bar, the suspension from the first pressure vessel was pumped into the flow reactor and converted to a laminar extensional/shear flow. At the same time, the coagulant was guided in the mixing zone direction, toward a precipitation nozzle. In the mixing zone, the laminar extensional flow of aqueous suspension of MMT and latex met the coagulant, whereupon the latex coagulated. The MMT was incorporated into the polymer matrix. The coagulate was then filtered, washed and dried at 55° C. and stored as a masterbatch.

1.5 Selection and Properties of the Sheet Silicates

The selection criterion for the sheet silicates to be used in accordance with the invention was the water swelling, in which the exfoliation was monitored by SAXS measurements. The precipitation characteristics of the latices and the sheet silicates were monitored via dynamic light scattering and measurements of the zeta potential as a function of the nature and concentration of various cations ($Ca^{2+}$, $Mg^{2+}$ and $H^+$).

Depending on the type, NBR and HXNBR latices begin to coagulate at pH values of 4.1-4.8. As a result of the negatively charged silicate platelets of the sheet silicate, this limit in latex/MMT suspensions is shifted toward lower pH values.

In order to monitor the precipitation kinetics, the DLS scattered light method was used (see above), by means of which the time constants of the precipitation are obtainable, these being required for the design of the length of the reaction zone in the flow tube before the juncture of mixing of the latex/MMT system with the coagulant. The flow properties of the latices, the MMT suspensions and the latex/MMT mixtures were determined as a function of the concentration and of the pressure applied in order to ascertain key data for the reactor setup and the CDLC process design.

1.6 Chemical Composition of the Sheet Silicates Used

TABLE 3

| | Elemental analysis | | |
|---|---|---|---|
| Element | Proportion by mass in % in the Nanofil® 116 | Proportion by mass in % in the Na⁺Cloisite | Proportion by mass in % in the Nanocor® PGN |
| Silicon | 27.5 | 28.1 | 27.9 |
| Aluminum | 8.4 | 10.5 | 5.7 |
| Calcium | 1.2 | 0.4 | 0.6 |
| Iron | 2.2 | 2.9 | 2.0 |
| Magnesium | 3.0 | 1.4 | 0.6 |
| Sodium | 3.1 | 2.5 | 2.1 |

2. Determination of the Properties of Inventive MMT-Containing Nanocomposites; RPA Experiments The storage modulus G' and loss modulus G" of the nanocomposite samples were determined by means of an instrument from Alpha Technologies (Monsanto RPA 2000). The experiments were conducted at 80° C. at a frequency of 1 Hz and an elongation amplitude range of 0.28% to 400%.

2.1 $H^1$ NMR Experiments

Nuclear spin resonance spectroscopy (NMR spectroscopy) is a spectroscopic method for examining the electronic environment of individual atoms and/or interactions with the neighboring atoms. It enables the elucidation of the structure and the dynamics of molecules, and also determinations of concentration. In the course of the studies relating to the present invention, $H^1$ NMR experiments were conducted both on non-vulcanized and on vulcanized samples with an instrument from Innovative Imaging Corp. KG (XLDS-15). The measurement temperature was 100° C. at a frequency of 15 MHz. The samples prepared were analyzed in glass capillaries that were open at both ends.

As well as the swelling properties of the nanocomposites obtainable in accordance with the invention, nuclear resonance measurements likewise gave important information about the strength of the latex-MMT interactions. The mobility of polymer chains is typically reported via the spin-lattice relaxation time $T_2$. The lower this value, the lower the chain mobility and the more marked the physisorption of the polymer onto the surface of the sheet silicate.

The $T_2$ times of the nanocomposites obtainable in accordance with the invention from the process of the invention, with equal volume fractions, were much smaller than in the case of mechanically mixed samples according to EP 2 168

918 A1. In the case of a fill level of 2% by volume of sheet silicate, by the process of the invention, relative relaxation times of about 0.85 were achieved. The same value was obtained in the case of mechanical mixing only by an amount of MMT 9 times higher. As already shown in the swelling experiments, the process of the invention achieved distinct reductions in chain mobility based on higher latex-MMT interaction.

2.2 TEM Images and Determination of the Contact Area

The TEM images were taken with a Zeiss Libra 120 under an acceleration voltage of 120 kV. For determination of the theoretically achievable contact area, exfoliated silicate platelets in the nanocomposite obtainable by the process of the invention were recorded by means of TEM, imaged and analyzed with regard to their diameter and thickness. For this purpose, nanocomposites produced by the process of the invention, with the aid of a diamond cutter at 213 K with an ultramicrotome (EM FC 6 type, from Leica), ultrathin sections of 100 nm were prepared and transferred from an ultramicrotome reservoir at 213 K to a Cu grid (Athene 400 (400 mesh) G2004 was used for measurements with Cu grids without a carbon film, and carbon film on 400 mesh S160-4 grids was used for measurements with Cu grids with a carbon film) (K=kelvin). This Cu grid was introduced into the TEM instrument via the lock and analyzed at an acceleration voltage of 120 kV. The average dimensions of length, width and height, the underlying cuboidal form and the density of 2.6 g/cm$^3$ of the sheet silicate used were used to determine the mean specific surface area of the individual platelets as 530±50 m$^2$/g of sheet silicate. Taking account of the volume fraction of the sheet silicate used in the masterbatch, the latex-MMT contact area was calculated for various amounts of sheet silicate used and compared to experimental data from the swelling level.

2.3 Morphology of the MMT-Containing Nanocomposite

As shown by the TEM studies, the MMT-silicate platelets produced by means of the process of the invention were exfoliated in the nanocomposites produced therefrom, and in the masterbatches to be produced in turn from these, were homogeneously dispersed and were oriented in flow direction of the flow reactor. By contrast, in the case of mechanically incorporated MMT according to EP 2 168 918 A1, predominantly dispersed tactoids were present. Correspondingly, in SAXS measurements, a small reflection peak that can be assigned to reaggregated silicate platelets (m tactoids) was observed.

In the nanocomposites produced in accordance with the invention by CDLC methods with a Schlick 772 precipitation nozzle with 3 feed points separated by 120°, not less than 80% of the silicate platelets were in exfoliated form. In the case of use of an external mixing nozzle of the Schlick type, by contrast, somewhat higher aggregation was observed. The exfoliation level in the case of use of an external mixing nozzle, however, was still about 70% and hence much higher than in the case of nanocomposites from the prior art processes.

The morphology of MMT-containing nanocomposites, firstly produced according to the prior art, and secondly produced by the process of the invention, was recorded by means of transmission electron microscopy TEM. The analysis of many silicate platelets and tactoids created an overview of the particle sizes present in the system.

TABLE 4

Results from the particle counting of a nanocomposite according to the prior art (EP 2 168 918 A1) with PGN (dosage: 3.5% by volume of MMT in the nanocomposite)

| | Particle size [nm] | | | | | | | | | |
|---|---|---|---|---|---|---|---|---|---|---|
| | 100 | 150 | 200 | 250 | 300 | 350 | 400 | 450 | 500 | >500 |
| Frequency [%] | — | ~2 | ~10 | ~16 | ~10 | ~24 | ~13 | ~5 | ~5 | ~15 |

Tab. 4 indicates the frequency of the particle size in a nanocomposite produced according to EP 2 168 918 A1. This has a maximum for particle sizes in the region of 350 nm.

In the case of tactoids where the sheet silicates are in an agglomerated state, it is essentially not possible to distinguish between the width, length and thickness of the individual silicate platelets. The study of individual silicate platelets obtained by the process of the invention showed that the length distribution in the exfoliated state had a maximum at about 150 nm. In the case of nanocomposites that were obtained by mechanical mixing according to EP 2 168 918 A1, very large agglomerates with a maximum in the length distribution at about 350 nm were present. The energy introduced by the mechanical mixing process was insufficient for individualization of the sheet silicates.

TABLE 5

Particle size distribution of a nanocomposite of the invention produced by CDLC methods (dosage: 3.5% by volume of MMT in the nanocomposite)

| | Particle size [nm] | | | | | |
|---|---|---|---|---|---|---|
| | 50 | 100 | 150 | 200 | 250 | >300 |
| Frequency [%] | ~2 | ~15 | ~38 | ~30 | ~12.5 | ~2.5 |

The fill level of an MMT-based nanocomposite produced in accordance with the invention by CDLC methods, examined by means of TEM (transmission electron microscopy), as in the case of the (EP 2 168 918 A1) mechanical method, was 3.5% by volume, which, given a density of 2.3 g/cm$^3$, corresponds to 2% by weight. It was found that the layers of the montmorillonites in the process of the invention, especially CDLC methods, consisted to an extent of more than 80% of individual layers and were significantly thinner than an MMT-based nanocomposite produced according to the prior art.

With >80% individual layers, the CDLC method that was especially preferred in accordance with the invention had given rise to a system with very high dispersion in which the tactoid structure, as was still present according to prior art processes, no longer existed.

The separation of the layers of the tactoid significantly increased the specific surface area available through use of a mixing nozzle in the nanocomposite.

The surface area made available thus allows additional interaction with the rubber in the latex. By contrast with nano composites obtainable by mechanical mixing according to EP 2 168 918 A1, it was possible to produce a true filler network through the use of a mixing nozzle. Most of the particle sizes were in the range from 150 to 200 nm (see tab. 5). The particle sizes essentially do not differ from the frequency distribution of the sheet silicate in the rubber. This suggests an optimal degree of separation of the layers without reaggregation of the silicate platelets through use of a mixing nozzle.

TABLE 6

Comparison of the median particle size d50 at xyz nm and 2% by mass dosage of the MMT in the nanocomposite

|  | EP2168918A1 | DE102007048995A1 | Inventive; CDLC method |
|---|---|---|---|
| Primary latex |  |  |  |
| NBR 1 | 380 | 250 | 150 |
| NBR 2 | 350 | 250 | 150 |
| NBR 3 | 340 | 240 | 160 |
| E-SBR (23% styrene) | 400 | 250 | 150 |
| E-SBR (33% styrene) | 390 | 240 | 150 |
| E-SBR (40% styrene) | 380 | 240 | 160 |
| NR | 330 | 240 | 160 |
| Secondary latex |  |  |  |
| XHNBR | 340 | 210 | 140 |
| XNBR (carboxylated NBR with about 30% ACN from Eliochem) | 350 | 220 | 150 |
| S-SBR (Buna VSL 2525-0) | 390 | 250 | 160 |
| S-SBR (Buna VSL 5025-2 HM) | 380 | 250 | 150 |
| Amino S-SBR (Buna VSL VP PBR4057) | 380 | 250 | 160 |
| Carboxylated S-SBR (Buna VSL VP PBR4088 RJ) | 370 | 240 | 150 |
| Butyl 101-3 | 380 | 250 | 160 |
| Halobutyl Lanxess X_Butyl BB2030 | 380 | 250 | 150 |

It is apparent from tab. 6 that systematic differences exist between the prior art processes and the process of the invention, especially the CDLC method, as to the median particle size possessed by the sheet silicates in the nanocomposite. It becomes clear that with the process of the invention, for the nanocomposite in a wide variety of different latices, i.e. both for primary latices and secondary latices (lower part of the table), median particle sizes d50 in the range from 140 to 160 nm are achieved, whereas the prior art (DE 102007048995 A1) achieves 210 nm as the lowest value only in the case of XHNBR. In addition, the results in tab. 6 make it clear that with there is virtually no difference in relation to median particle size between primary latex (NBR 1 to NR) and secondary latex (XHNBR to Lanxess X_Butyl BB2030).

2.4 Effect of the Production Processes and the Mixing Chamber Design

The intensities of the peaks in SAXS measurements on MMT-based nanocomposites for determination of the layer separation of the individual layers of the sheet silicates were evaluated by calculating the areas of the peaks beneath the SAXS curves (SAXS=small-angle x-ray scattering). A STOE theta-theta instrument with Cu-Kα radiation ($\lambda$=15.4 nm) was used. The scattering angle 2θ was varied from 1 to 10° and the 2θ values were converted to layer separations in the silicate platelets with the aid of the Bragg equation.

For examination of nanocomposites, essentially two test methods were employed: electron microscopy and small-angle x-ray scattering (SAXS). SAXS has the great advantage over microscopy that the sample as a whole is considered. As a result, the user obtains very good average values of high statistical quality. In small angle x-ray scattering, the whole sample is considered at once, which means that very good average values of high statistical quality are obtained. By contrast with electron microscopy, small angle x-ray scattering entails only very simple sample preparation, which lowers the risk of destroying structures before they can be measured. Small angle x-ray scattering (SAXS) enables the determination of nanostructures having a size of about 1 to 100 nm that are dispersed in a matrix material. The SAXS method gives information relating to:

particle size and particle size distribution,
particle form (ball, cylinder, lamella) and internal structure (core-shell),
porosity (surface to volume ratio),
order (crystallinity) and orientation of the particles, and
molecular weight and aggregation number.

In a SAXS experiment, the sample is exposed to an x-ray beam. The nanostructures within the sample scatter the x-ray light with a characteristic, angle-dependent intensity distribution which s recorded with a detector. The scattering pattern measured is used to determine the size and shape of the nanostructures in the sample. In the measurement, a large part of the sample is irradiated simultaneously, such that the scattering pattern always represents a statistical mean over all the nanostructures irradiated. The actual structure information is obtained from the scattering pattern by means of suitable software (see: Nanomateriallen: Charakterisierung und Messung [Nanomaterials: Characterization and Measurement], LUBW Landesanstalt für Umwelt, Messungen und Naturschutz Baden-Württemberg [Baden-Wütttemberg State Office for Environment, Measurement and Nature Conservancy], Karlsruhe, February 2014).

The assessment of the three production processes of mechanical mixing of the rubber melt according to EP 2 168 918 A1, of static latex compounding (SLC) according to DE 10 2007 048 995 A1 and of continuous dynamic latex compounding by the process of the invention, especially the CDLC method, was in each case effected on the noncrosslinked nanocomposite obtained. It was found here that, on comparison of a nanocomposite having an MMT content of 6% by volume, the greatest peak area was detected for mechanical mixing. This means that the tactoids of the montmorillonites could not be separated by mechanical mixing.

In the case of static latex compounding according to EP 2 168 918 A1, the MMTs used as sheet silicates were pre-swollen in water, as was also the case in process step a) of the process of the invention. The MMTs were therefore in a state with opened-up sheet silicate layers at the start of the SAXS measurements. Only coagulation or further processing could lead to partial reagglomeration. By comparison with mechanical mixing according to EP 2 168 918 A1, the peak area in the case of static latex compounding was 30% smaller, i.e. about 70% of the exfoliated sheet silicates were agglomerated again in the coagulation.

The lowest peak areas were detected by SAXS measurements in the case of the continuous, dynamic latex compounding of the invention, especially the CDLC method.

TABLE 7

Table 7 shows the exfoliation level obtainable from x-ray diffraction for the nanocomposites synthesized in the context of the present invention compared to nanocomposites produced according to prior art

|  | EP2168918A1 | DE102007048995A1 | Inventive; CDLC method |
|---|---|---|---|
| Primary latex |  |  |  |
| NBR 1 | 15 | 38 | 80 |
| NBR 2 | 15 | 39 | 81 |
| NBR 3 | 17 | 39 | 86 |
| E-SBR (23% styrene) | 16 | 37 | 76 |
| E-SBR (33% styrene) | 16 | 37 | 76 |
| E-SBR (40% styrene) | 15 | 38 | 80 |
| NR | 18 | 40 | 83 |
| Secondary latex |  |  |  |
| XHNBR | 17 | 42 | 91 |
| XNBR (carboxylated NBR with about 30% ACN tram Eliochem) | 16 | 40 | 88 |
| S-SBR (Buna VSL 2525-0) | 16 | 37 | 80 |
| S-SBR (Buna VSL 5025-2 HM) | 15 | 37 | 79 |
| Amino S-SBR (Buna VSL VP PBR4057) | 17 | 39 | 84 |
| Carboxylated S-SBR (Buna VSL VP PBR4088 RJ) | 16 | 41 | 87 |
| Butyl 101-3 | 15 | 40 | 72 |
| Halobutyl Lanxess X_Butyl BB2030 | 15 | 39 | 74 |

Tab. 7 shows that, for nanocomposites produced especially by the CDLC method of the invention, with a wide variety of different latices, i.e. both for primary latices and secondary latices, exfoliation levels in the range from 72 to 88 are achieved, whereas nanocomposites produced according to DE 10 2007 048 995 A1 attain only exfoliation levels in the range from 37 to 42 and nanocomposites produced by mechanical mixing achieve exfoliation levels in the range from 15 to 18.

2.5 Effect of Mixing Chamber Design

Optimal and homogeneous mixing of the latex-MMT suspension obtained in process step c) and of the coagulant is, as a result of the present invention, a basic prerequisite for the creation of homogeneous nanocomposites.

For the experiments using a graded flow reactor, the mixing chamber or mixing aggregate used was a T-piece for addition of the coagulant In the especially preferred gradeless design of the invention for the flow reactor, a mixing nozzle that had three addition points each offset by 120° was used. By virtue of this construction, it was possible to add the coagulant even more homogeneously to the common dispersion of latex and sheet silicate and distribute it therein.

A further means of addition chosen was a mixing nozzle with external mixing, in the case of which the coagulation was brought about by the spraying of two hollow cones into one another outside the flow reactor (Schlick type 772 nozzle). This external mixing nozzle was used in a combination with the flow reactor.

The achieved in the context of the present invention showed that a flow reactor composed of a conically tapering tube in which the coagulant to be used as precipitant was fed at three points each separated by 120° from one another by means of a mixing nozzle into the laminar extensional flow of sheet silicate and latex (=CDLC method) led to the highest storage moduli of the nanocomposites examined, since a high degree of commixing was possible here by virtue of the three offset addition points. In this case, no extension of the mixing nozzle used as mixing chamber was required.

2.6 Viscoelastic Characteristics of Uncrosslinked Nanocomposites

Variation of the mixing time of latex with suspended sheet silicate

For preparation of the suspension, the latex was stirred and then coagulated with the montmorillonite suspension at room temperature in a laboratory stirred reactor. The time for the operation of stirring the two components caused distinct differences in the dispersion and hence in the viscoelastic properties.

Tab. 8 shows the storage modulus of a 3% by volume nanocomposite of PGN and NBR 1 prepared in accordance with the invention for varying mixing times.

TABLE 8

Storage modulus of an inventive nanocomposite of PGN and NBR as a function of mixing time in step b)

| t in hours | 0 | 1.5 | 6 | 25 |
|---|---|---|---|---|
| $(G'_1 G'_0)_{0.26}$ | 5 +/− 1 | 11 +/− 1.5 | 10 +/− 1.5 | 11 +/− 2.5 |

It becomes clear from tab. 8 that mixing of latex and sodium montmorillonite for a few seconds led to a lower storage modulus than in the case of more prolonged mixing over a period of at least 1.5 hours. A further extension in the mixing time up to 25 hours did not lead to any further significant differences in the storage moduli. Substance mixtures produced under the same experimental conditions, in the case of low proportions by volume of MMT, showed a drop in the storage modulus G' or a maximum in the loss modulus G" as a function of the deformation amplitude. The log-log plot of log G' ~α log φ was used to ascertain the percolation threshold and the exponential rise α in G'. The mechanical percolation threshold (MPS) for the substance mixtures comprising NBR P3445 and NBR P3430 was 1.6% by volume, and in the case of NBR 4550 F 1.8% by volume. Nanocomposites composed of secondary latex that were analyzed in the same way showed a mechanical percolation threshold of:

styrene-butadiene rubber (S-SBR: Buna® VSL 2525-0: 2.4% by volume, Buna® VSL 5025-2 HM: 2.3% by volume and Amino-S-SBR: Buna® VSL VP PBR 4057: 2.0% by volume and carboxylated Buna® VSL VP PBR 4088 RJ: 2.0% by volume) and Lanxess Butyl 101-3: 2.7% by volume and Halobutyl Lanxess X_Buty™ BB2030: 2.5% by volume and HXNBR: 1.5% by volume.

According to http://www.spektrum.de/lexikon/physik/perkolationschwelle/11049Perkolationsschwelle, the percolation threshold in percolation theory is the critical value for a parameter that regulates the size of clusters. In the thermodynamic boundary case, above the percolation threshold there is a probability of 1 of there being a percolating duster (i.e. a cluster that connects the boundary points of the system); below the percolation threshold the probability of this is zero. At the percolation threshold, the largest cluster usually has the property of a fractal.

Tab. 9 shows, for a wide variety of different latices, the percentages by volume of MMT required to attain the mechanical percolation threshold

|  | EP2168918A1 | DE102007048995A1 | Inventive; CDLC method |
| --- | --- | --- | --- |
| Primary latex |  |  |  |
| NBR 1 | 10 | 2.1 | 1.6 |
| NBR 2 | 11 | 2.2 | 1.6 |
| NBR 3 | 12 | 2.2 | 1.8 |
| E-SBR (23% styrene) | 18 | 2.7 | 1.8 |
| E-SBR (33% styrene) | 18 | 2.6 | 1.7 |
| E-SBR (40% styrene) | 17 | 2.4 | 1.5 |
| NR | 18 | 2.6 | 1.7 |
| Secondary latex |  |  |  |
| XHNBR | 11 | 1.9 | 1.5 |
| XNBR (carboxylated NBR with about 30% ACN from Eliochem) | 10 | 2 | 1.5 |
| S-SBR (Buna VSL 2525-0) | 20 | 2.9 | 2.4 |
| S-SBR (Buna VSL 5025-2 HM) | 20 | 2.9 | 2.3 |
| Amino S-SBR (Buna VSL VP PBR4057) | 19 | 2.8 | 2 |
| Carboxylated S-SBR (Buna VSL VP PBR4088 RJ) | 18 | 2.7 | 2 |
| Butyl 101-3 | 20 | 3.3 | 2.7 |
| Halobutyl Lanxess X_Butyl BB2030 | 19 | 3.2 | 2.5 |

It becomes clear from tab. 9 that, for nanocomposites produced by the process of the invention, especially by CDLC methods, with a wide variety of different latices, i.e. both for primary latices and secondary latices, only 1.5% to 2.7% by volume of MMT is required to attain the mechanical percolation threshold, whereas nanocomposites obtainable according to DE 102007048995 A1 require at least 1.9% to 3.2% by volume of MMT for this purpose and nanocomposites produced according to EP 2 168 918 A1 even require 10% to 20% by volume.

Tab. 10 shows the exponents of the relative Young's modulus achieved after attainment of the mechanical percolation threshold

|  | EP2168918A1 | BB102007048995A1 | Inventive; CDLC method |
| --- | --- | --- | --- |
| Primary latex |  |  |  |
| NBR 1 | 0.45 | 1 | 3.4 |
| NBR 2 | 0.45 | 1 | 3.4 |
| NBR 3 | 0.5 | 1.1 | 3.5 |
| E-SBR (23% styrene) | 0.35 | 0.95 | 2.3 |
| E-SBR (33% styrene) | 0.4 | 0.95 | 2.4 |
| E-SBR (40% styrene) | 0.45 | 0.98 | 2.5 |
| NR | 0.6 | 1.3 | 2.7 |
| Secondary latex |  |  |  |
| XHNBR | 0.55 | 1.6 | 4.2 |
| XNBR (carboxylated NBR with about 30% ACN from Eliochem) | 0.6 | 1.7 | 3.4 |
| S-SBR (Buna VSL 2525-0) | 0.4 | 1 | 2.4 |
| S-SBR (Buna VSL 5025-2 HM) | 0.45 | 1 | 2.5 |
| Amino S-SBR (Buna VSL VP PBR4057) | 0.5 | 1.2 | 2.8 |
| Carboxylated S-SBR (Buna VSL VP PBR4088 RJ) | 0.55 | 1.3 | 2.9 |
| Butyl 101-3 | 0.4 | 1.05 | 2.4 |
| Halobutyl Lanxess X_Butyl BB2030 | 0.4 | 1.05 | 2.5 |

Tab. 10 shows, for the process of the invention, especially for the CDLC method, the highest exponents attained in the relative Young's modulus after attainment of the mechanical percolation threshold.

2.7 Effect of Increasing Filler Level in Uncrosslinked, MMT-Based Nanocomposites In the case of low filler levels, there is hydrodynamic strengthening through formation of filler-rubber interactions which is independent of deformation. By contrast, in the case of reinforcing fillers, there is a significant increase in the storage modulus through formation of filler-filler networks with increasing proportion by volume; A. I. Medallia "Effect of Carbon Black on dynamic properties of rubber vulcanizates" in Rubber Chemistry and Technology, vol. 51, pages 437 ff. (1978) and A. R. Payne in Rubber Plastik Age, August 1961, pages 963 ff.

For small-volume contents, in the course of the studies relating to the present invention, only slight changes in the storage modulus were registered. In the range from 1.5% to 2% by volume of sheet silicate, there was a distinctly increased rise in the storage modulus. This is attributable to formation of filler-finer contacts. With rising filler content, there was accordingly a distinct increase in the Payne effect.

With rising filler level of sheet silicate, there was an increase in the loss modulus. In the region in which there was a drop in the storage modulus, the loss modulus G" for more highly filled systems over and above 2% by volume of MMT showed a distinct maximum in the deformation amplitude range of 10% by volume. Overall, the values for the loss component of the nanocomposites examined were much lower than of the stored component.

By log-log plotting of the storage moduli of the nanocomposites filled with fillers based on the storage modulus of the unfilled nanocomposites as a function of the volume fraction, two straight lines of different slope were obtained, which suggested two potential functions. The point of intersection of the straight lines was at 1.6% by volume and corresponded to the proportion by volume of sheet silicate over and above which a filler-filler network is formed.

The slopes of the two lines corresponded to the exponents of the potential function. In the region before the percolation threshold, an increase in the storage modulus G' by an exponent of 0.28 was found. Over and above a volume fraction of 0.016, there was a 15-fold rise in the exponent. This rise is the consequence of the formation of a filler-filler network that formed over and above a filler content of 1.6% by volume of PGN in the case of NBR P3445 F.

According to the above remarks, as expected, there was a noticeable increase in the storage modulus G' with rising filler content. Over and above a volume fraction of 0.015, the increase was much more marked than below this value. For determination of the percolation threshold, a log-log plot was chosen. The percolation point was at 1.6% by volume for the latex type NBR P3430 F, and also for NBR P3445 F.

There was a less significant rise in the exponential functions compared to NBR P3445 F. After the percolation threshold, there was a 13-fold rise in the exponential factor.

In the case of the Krynac® 4450 F rubber type with an ACN content of 39%, percolation characteristics comparable to the two other NBR types were apparent. The percolation threshold here was about 1.8% by volume, and there was a 19-fold increase in the exponent.

Comparison of the different NBR types led to similar strengthening, relative to the unfilled rubber. The percolation thresholds in the uncrosslinked material were found within the range from 1.6% by volume to 1.8% by volume.

Nanocomposites made from secondary latex that were analyzed in the same way showed the following exponents: styrene-butadiene rubber (S-SBR: Buna® VSL 2525-0: 8-fold, Buna® VSL 5025-2 HM: 8-fold and Amino-S-SBR: Buna® VSL VP PBR 4057: 9-fold and carboxylated Buna® VSL VP PBR 4088 RJ: 9-fold) and Lanxess Butyl 101-3: 6-fold and Halobutyl Lanxess X_Butyl™ BB2030: 7-fold and HXNBR: 22-fold. The results for the different methods are summarized in table 11.

Tab. 11 Shows, for the Nanocomposites Obtained with a Wide Variety of Different Latices, Multiplication of the Exponents of the Potential Function after Attainment of the Mechanical Percolation Threshold

|  | EP2168918A1 | DE102007048995A1 | Inventive; CDLC method |
|---|---|---|---|
| Primary latex |  |  |  |
| NBR 1 | 6 | 11 | 15 |
| NBR 2 | 5 | 10 | 13 |
| NBR 3 | 7 | 11 | 19 |
| E-SBR (23% styrene) | 2.7 | 5 | 7 |
| E-SBR (33% styrene) | 2.9 | 6 | 8 |
| E-SBR (40% styrene) | 3 | 6 | 8 |
| NR | 3.3 | 5 | 7 |
| Secondary latex |  |  |  |
| XHNBR | 8 | 12 | 22 |
| XNBR (carbonated NBR with about 30% ACN from Eliochem) | 7 | 10 | 18 |
| S-SBR (Buna VSL 2525-0) | 3.2 | 4 | 8 |
| S-SBR (Buna VSL 5025-2 HM) | 3.2 | 4 | 8 |
| Amino S-SBR (Buna VSL VP PBR4057) | 3.6 | 5 | 9 |
| Carboxylated S-SBR (Buna VSL VP PBR4088 RJ) | 3.6 | 5 | 9 |
| Butyl 101-3 | 2.4 | 4 | 6 |
| Halobutyl Lanxess X_Butyl BB2030 | 2.4 | 5 | 7 |

It is apparent from tab. 11 that the process of the invention, especially the CDLC method, leads to nanocomposites based on a wide variety of different latices that feature the highest multiplication values of the exponents of the potential function after attainment of the mechanical percolation threshold.

2.8 Determination of the Theoretical Contact Area in the Case of Uncrosslinked MMT-Based Nanocomposites For determination of the theoretical contact area, silicate platelets present in the latex were imaged by means of transmission electron microscopy (TEM) and analyzed. The average parameters of length, width and height, for the underlying cuboidal form and a density of 2.6 g/cm$^3$, were used to calculate the surface area of a single silicate platelet for the sheet silicate used in each case. 530 m$^2$/g of sheet silicate—MMT here—was the value determined. Taking account of the volume fraction of the sheet silicate used in the MMT-based nanocomposite masterbatch, the contact area was calculated for various amounts of sheet silicate used and compared to experimental data.

Tab. 12 Shows the Mean Particle Surface Area of the Sheet Silicates in the Nanocomposite with a Dosage of 2% by Volume in m$^2$/g

|  | EP2168918A1 | DE102007048995A1 | Inventive; CDLC method |
|---|---|---|---|
| Primary latex |  |  |  |
| NBR 1 | 4 | 11 | 27 |
| NBR 2 | 4 | 10.5 | 26.5 |
| NBR 3 | 4 | 10.5 | 27.5 |
| E-SBR (23% styrene) | 3.5 | 9.5 | 25.5 |
| E-SBR (33% styrene) | .5 | 9.5 | 25.5 |
| E-SBR (40% styrene) | 3.75 | 10 | 26 |
| NR | 3.75 | 10.5 | 26.5 |
| Secondary latex |  |  |  |
| XHNBR | 4.5 | 11.5 | 28 |
| XNBR (carboxylated NBR with about 30% ACN from Eliochem) | 4 | 11 | 27 |
| S-SBR (Buna VSL 2525-0) | 3 | 9.5 | 25.5 |
| S-SBR (Buna VSL 5025-2 HM) | 3 | 9.5 | 25.5 |
| Amino S-SBR (Buna VSL VP PBR4057) | 3.5 | 10 | 26 |
| Carboxylated S-SBR (Buna VSL VP PBR4088 RJ) | 3.5 | 10 | 26 |
| Butyl 101-3 | 3 | 9.5 | 25.5 |
| Halobutyl Lanxess X_Butyl BB2030 | 3 | 9.5 | 25.5 |

Tab. 12 shows a distinct increase in the mean particle surface area of nanocomposite obtainable by the process of the invention, especially the CDLC method, compared to the prior art processes. Moreover, the results in tab. 12 show that the mean particle surface area is independent of the latex used, i.e. there are only slight differences at most in the mean particle surface area with use of primary latex or secondary latex.

2.9 Effect of the Process of the Invention

Especially nanocomposites produced by means of the CDLC process of the invention, when used in vulcanizates, achieved a positive strengthening of the polymeric matrix manifested in elevated hardness, improved dynamic-mechanical properties and stress-strain properties of the vulcanized elastomer materials.

2.9.1 Shore A Hardness/Measurement on Vulcanizates

Good dispersion of nanocomposites of the invention in vulcanizates leads to a rise in the hardness of the vulcanizates. The Shore A hardness was determined, in the test method according to DIN 53505 used in the context of the present invention, at 23° C. via the penetration depth of a specific needle into a vulcanizate which had been produced beforehand using MMT-containing nanocomposites. The scale range encompassed the range from 0 to 100 Shore.

The measurements of Shore A hardness in the context of the present invention showed the general trend that the hardness increased in a linear manner at first with low sheet silicate filler levels and assumed higher slopes above the mechanical percolation threshold.

A nanocomposite produced in accordance with the invention with 3% by volume of sheet silicate led to an increase in hardness by about 40%!

The relative hardness of NBR 3 at low volume fractions was slightly elevated compared to NBR 1. In the case of volume fractions of 0.04, the hardnesses based on the unfilled rubber in the case of NBR 1 and BR 3 rose by 70% and 60% respectively, "unfilled rubber" meaning a rubber without MMT-containing nanocomposites. Inventive nanocomposites made from secondary latex that were analyzed in the same way showed the following increase in Shore A hardness:
styrene-butadiene rubber (S-SBR: Buna VSL 2525-0: 45%, Buna VSL 5025-2 HM: 55% and Amino-S-SBR: Buna VSL VP PBR 4057: 60% and carboxylated Buba VSL VP PBR 4088 RJ: 65%) and Lanxess Butyl 101-3: 45% and Halobutyl Lanxess X_Butyl™ BB2030: 50% and HXNBR: 90%.

2.9.2 Dynamic-Mechanical Properties

Figure 2:
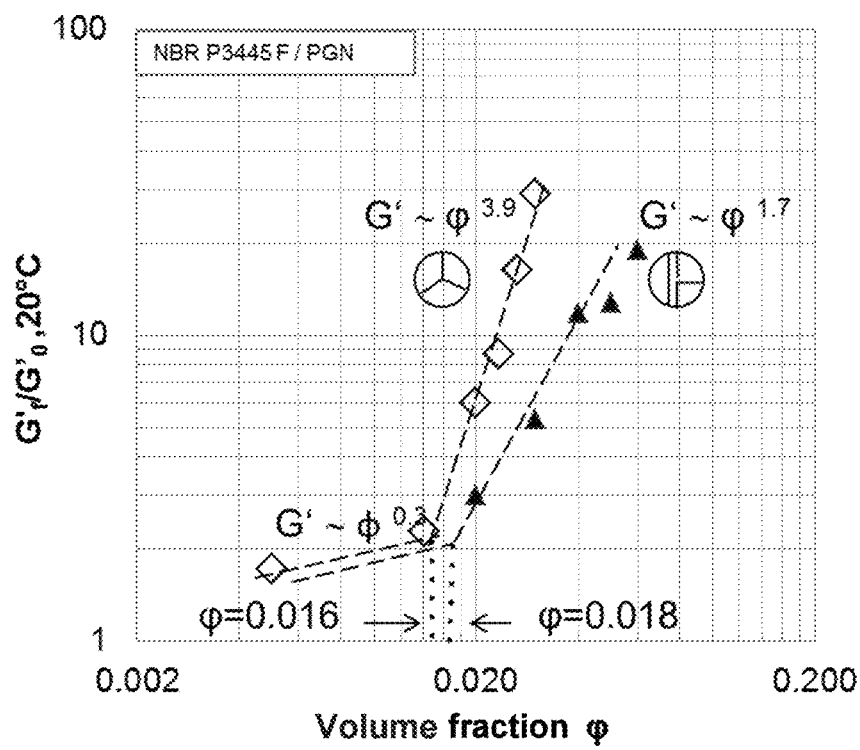
FIG. 2 is a graph depicting the effect of the degree of opening-up of the sheet silicate in process step a) with increasing amount of the sheet silicates on the dynamic-mechanical properties of the MMT-containing nanocomposites.

The effect of the degree of opening-up of the sheet silicate in process step a) with increasing amount of the sheet silicates on the dynamic-mechanical properties of the MMT-containing nanocomposites was determined in relation to unfilled polymers (meaning rubbers here) in FIG. 2. The study according to FIG. 2 was effected at room temperature and with an extension amplitude of 0.5%.

The storage modulus $G_f'/G_o'$, determined gave a mechanical percolation threshold for the mixing chamber of the CDLC method which is particularly preferred in accordance with the invention—symbolized by ⊗ —with the values measured symbolized by an open diamond of about 1.6% b volume, and, in the case of use of a T-piece as precipitation nozzle—symbolized by ⊕ —with the values measured symbolized by a filled triangle, as a result of the lower exfoliation, gave a mechanical percolation threshold of 1.8% by volume.

The best commixing was achieved with the ⊗ precipitation nozzle for use with preference in accordance with the invention, in which the coagulant to be used as precipitant is fed at three points each separated by 120° from one another into the laminar flow of exfoliated sheet silicate and latex, and reaggregation of the silicate platelets was largely avoided.

Over and above the percolation threshold, the storage moduli, in the case of use of a mixing nozzle to be used in accordance with the invention, depending on the filler level, increased with an exponent of 3.9. The exponent is 2.3 times higher than in the case of samples from the process in which a mixing nozzle was used in the form of a T-piece— symbolized by ⊕. The loss modulus G" Increased with a higher exponent compared to the storage modulus G'. In the case of a mixing nozzle in the form of a T-piece, symbolized by ⊕ —this influence was much smaller than in the case of use of the precipitation nozzle with coagulant feed at three points each separated by 120° which is to be used with preference in accordance with the invention.

This large increase in the loss modulus in the case of use of a ⊗ precipitation nozzle is correlated to the high aspect ratio and the fine distribution of the sheet silicates. The friction of the silicate platelets is therefore higher than in the case of isodimensional fillers such as carbon black. Therefore, dependence of the contribution on the exfoliation level can be assumed.

The physisorbed polymer chains at the filler surface led to a further contribution to the total solids content, which increased with the separation of silicate platelets. The results showed a greater increase in the loss modulus in the process of the invention, especially with use of an internal mixing nozzle of the ⊗ type, and hence better exfoliation of the MMT in the case of these samples.

The results from the studies with regard to the stress/strain properties of elastomers and vulcanizates showed that elastomers and vulcanizates filled with nanocomposites of the invention are significantly improved in terms of their elastic properties over the prior art by the exfoliated sheet silicate.

Figure 3:
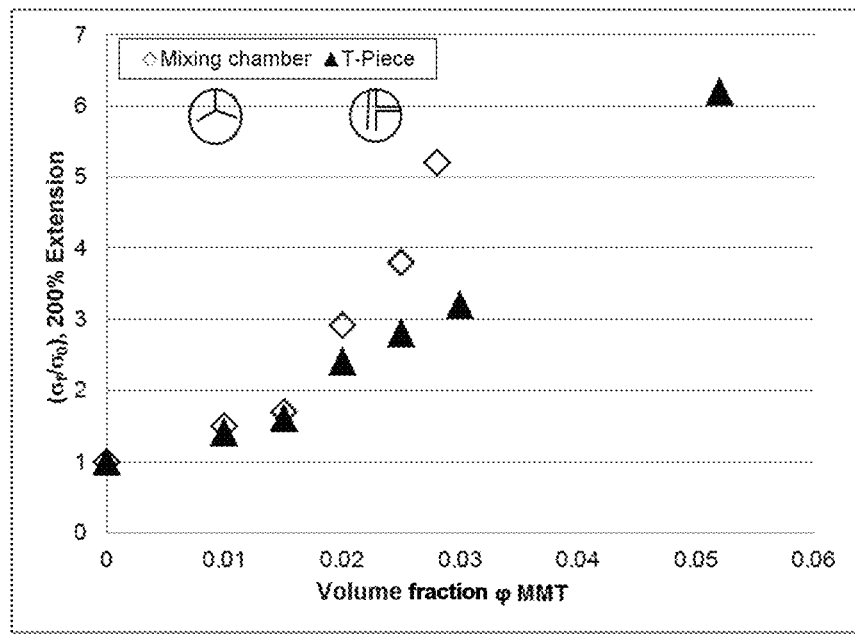
FIG. 3 is a graph depicting the effect on extension as a function of volume fraction.

In the case of nitrile rubber NBR 1, nanocomposites were produced with formulation 2 from table 10. While the unfilled sample according to FIG. 3 had a flat, concave profile of the stress-strain curves, more highly filled nanocomposites typically had a convex curve profile that led to distinct strengthening particularly at low to moderate extensions. According to FIG. 3, the stress values increased with increasing MMT content.

In the case of volume fractions below the percolation threshold, there were no apparent differences between the mixing chamber designs. In the case of volume fractions above the percolation threshold, there was a separation in the strengthening curves of the samples, with a distinctly greater rise in the curves having more highly exfoliated sheet silicate stacks owing to mixing nozzles for use in accordance with the invention.

The slope in the linear function corresponds to the modulus of elasticity E (Young's modulus) and is a measure of the stiffness of filled MMT-based nanocomposites produced in accordance with the invention. The log-log plot of the Young's modulus E can be used to determine the mechanical percolation threshold.

Figure 4:
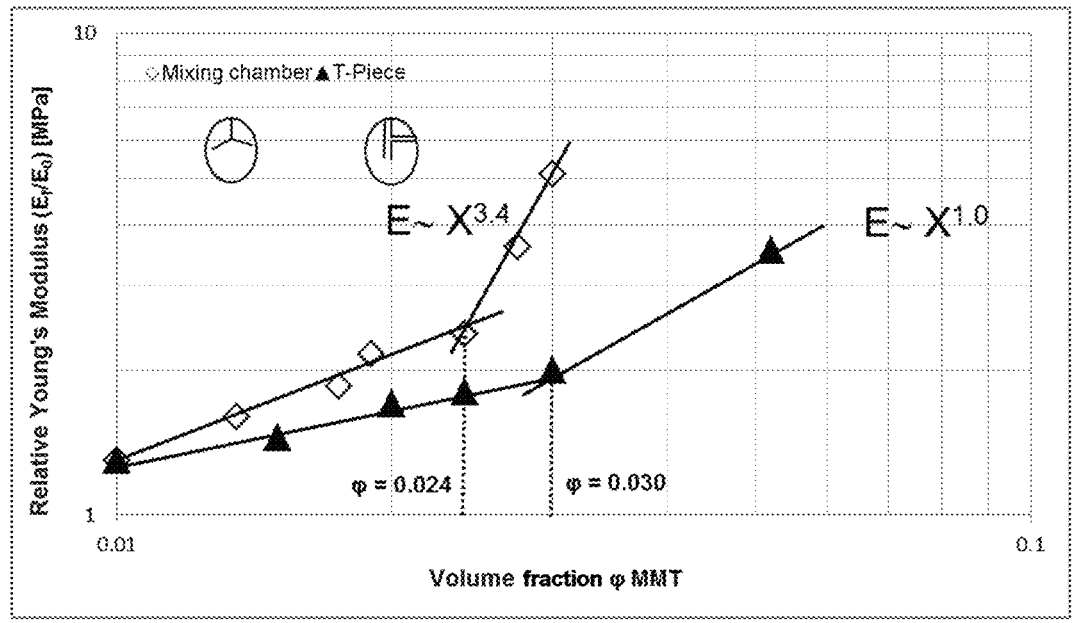
FIG. 4 is a graph depicting the effect on Young's modulus as a function of volume fraction.

According to FIG. 4, the profile of the Young's modulus began with a linear rise with increasing filler content. Above the percolation threshold, there was a significant change in the slope attributable to filler percolation. According to FIG. 4, in the case of use of the CDLC method with an internal mixing nozzle of the ⊗ type which is especially preferred in accordance with the invention, exponents of 3.4 were obtained. A T-piece for use as mixing nozzle in accordance with the invention still led to increases in the Young's modulus by an exponent of 1.0. The elevated exponent of the mixing chamber can be attributed to improved dispersion and separation of the silicate platelets.

Nanocomposites made from secondary latex that were analyzed in the same way showed the following exponents in the case of use of an internal mixing nozzle of the ⊗ type: styrene-butadiene rubber (S-SBR: Buna VSL 2525-0: 2.4, Buna VSL 5025-2 HM: 2.5 and Amino-S-SBR: Buna VSL VP PBR 4057: 2.8 and carboxylated Buba VSL VP PBR 4088 RJ: 2.9) and Lanxess Butyl 101-3: 2.4 and Halobutyl Lanxess X_Butyl™ BB2030: 2.5 and HXNBR: 4.2.

Figure 5:
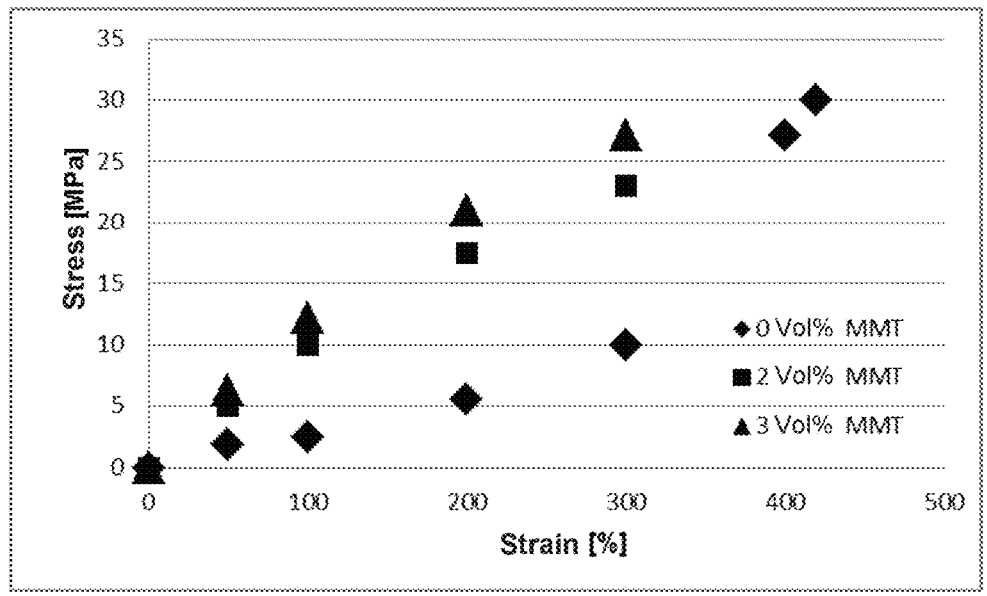
FIG. 5 is a graph depicting the effect on stress as a function of strain.

According to FIG. 5, the stress/strain curves of the unfilled and vulcanized HXNBR rubber showed extensions up to 400% and very high tensile strengths up to 30 MPa.

The use of sheet silicates led to a fundamental change in the shape of the curve. While the unfilled sample—i.e. without sheet silicate—followed a concave profile, the curves of the MMT-based nanocomposites produced in accordance with the invention had a characteristic convex curve profile. Strengthening was significantly increased. The advantages of an HXNBR rubber filled with MMT-based nanocomposite of the invention therefore lay in the very high strengthening potential with a maximum strain in the range from 150% to 200%.

3. Determination of the Properties of Rubber Vulcanizates Comprising MMT-Based Nanocomposites of the Invention

3.1 Swelling Experiments: Determination of the Polymer-Filler Interactions

The mass-based swelling level is defined as the quotient of the mass of the swollen vulcanizate and the mass of the unswollen vulcanizate. To determine the swelling levels for the vulcanizates examined in the context of the present invention, one sample each was stored in methyl ethyl ketone (MEK) at room temperature until determinations of mass on a fine analytical balance showed no further increase in mass, i.e. that the equilibrium swelling level had been attained. The interaction of the sheet silicates with the polymeric matrix led to the formation of a physical boundary layer, such that swelling of the polymer chain of the matrix polymer in this region was considerably limited or suppressed.

The following relationship is normally applicable: the greater the polymer content physisorbed at the interface to the sheet silicate, the smaller the level of swelling of the sample with the same amount of filler. In the case of sheet silicates, exfoliation of the silicate platelets, owing to the high aspect ratio, leads to an increase in the surface area available for the adsorptive interaction with the polymer/rubber. Owing to the very high specific surface area, small amounts of filer in platelet form are sufficient to physically bind a high proportion of the rubber and hence to arrive at a significant decrease in the swelling kinetics and the equilibrium swelling with a high filler level. The presence of sheet silicate present in a high aspect ratio additionally results in a significant increase in the diffusion pathway of low molecular weight compounds (gases, liquids), which gives rise to a diffusion barrier and results in a decrease in the permeation of low molecular weight compounds. Unfilled polymers, by contrast, do not have any barrier properties with regard to absorption of solvent, and the polymers can swell up to a saturation concentration of swellant.

The filler-polymer interaction parameter m was determined in the context of the experiments for this invention by means of the Kraus equation [Kraus G., J. Appl. Polym. Sci. 7 (1963) 861]:

$$\frac{V_{rF}}{V_{r0}} = \left[1 - m\left(\frac{\varphi}{1-\varphi}\right)\right] \quad (5)$$

with:

$$Vr_0 = \left[\frac{D \cdot \rho_P^{-1}}{D \cdot \rho_P^{-1} + A_0 \cdot \rho_L^{-1}}\right];$$

$$Vr_F = \left[\frac{D - \varphi T \cdot \rho_P^{-1}}{(D - \varphi T) \cdot \rho_P^{-1} + A_0 \cdot \rho_L^{-1}}\right] \quad (6)$$

D=mass of swollen sample
F=volume fraction of filler
T=mass of unswollen sample
$\rho_P$=density of polymer
$\rho_L$=density of solvent
$A_0$=mass of solvent absorbed
$\varphi$=volume fraction of the filler
m=filler-polymer interaction parameter
$V_{r,F}$=swelling level of polymer with filler
$V_{r,0}$=swelling level of polymer

TABLE 13

Swelling level of vulcanizates

| | EP2168918A1 | DE102007048995A1 | Inventive; CBLC method |
|---|---|---|---|
| Primary latex | | | |
| NBR 1 | 380 | 270 | 180 |
| NBR 2 | 380 | 270 | 180 |
| NBR 3 | 370 | 245 | 150 |
| E-SBR (23% styrene) | 460 | 375 | 310 |
| E-SBR (33% styrene) | 450 | 375 | 305 |
| E-SBR (40% styrene) | 430 | 360 | 295 |
| NR | 460 | 370 | 310 |
| Secondary latex | | | |
| XHNBR | 340 | 230 | 140 |
| XNBR (carboxylated NBR with about 30% ACN from Eliochem) | 350 | 230 | 150 |
| S-SBR (Buna VSL 2525-0) | 450 | 380 | 300 |
| S-SBR (Buna VSL 5025-2 HM) | 430 | 375 | 290 |
| Amino S-SBR (Buna VSL VP PBR4057) | 410 | 365 | 260 |
| Carboxylated S-SBR (Buna VSL VP PBR4088 RJ) | 410 | 350 | 260 |
| Butyl 101-3 | 460 | 410 | 320 |
| Halobutyl Lanxess X_Butyl BB2030 | 470 | 410 | 310 |

Tab. 13 shows the swelling levels for various vulcanizates which have been obtained from primary latices and secondary latices using nanocomposites of the invention and nanocomposites produced according to the prior art. Tab. 13 shows the distinct reduction in the swelling level of vulcanizates in the case of use of nanocomposites obtainable by the process of the invention, especially the CDLC method. In addition, the results in tab. 13 make it clear that there is virtually no difference in relation to the swelling level between primary latex and secondary latex.

3.2 Determination of the Coefficient of Diffusion

For determination of the coefficient of diffusion, the nanocomposites of the invention and nanocomposites obtainable according to the prior art were used to conduct swelling experiments in 2-butanone (MEK) as swelling medium at room temperature (23'C.+/−2° C.) according to DIN ISO 23529. The individual samples (thickness 3 mm) were analyzed, recorded and evaluated with a digital microscope from Reyence (VHX-600). The solvent was changed every 2 days.

The coefficient of diffusion was evaluated according to Crank [Crank J., "The Mathematics of Diffusion" $2^{nd}$-Edition, Oxford University Press, 1975]:

$$\frac{M_t}{M_\infty} = \frac{2}{\sqrt{\pi}} \sqrt{\frac{Dt}{a^2}} \quad (9)$$

$M_t$=amount of solvent absorbed at time t
$M_\infty$=amount of solvent absorbed (equilibrium)
D=coefficient of diffusion
t=time
a=thickness The aspect ratio is calculated according to Nielsen [L. E. Nielsen, J. Macromol. Sci. A1 (1967) 929]:

$$\frac{D_f}{D_0} = \frac{1}{1 + \alpha \varphi} \quad (10)$$

$D_f$=coefficient of diffusion of the filled material $D_0$=coefficient of diffusion of the unfilled material $\alpha$=aspect ratio $\varphi$=volume fraction The coefficient of diffusion D can be obtained by the solving of the differential equation from Fick's 2nd law, where c is the molar concentration, t is the time, D is the coefficient of diffusion and x is the location.

$$\frac{\partial c}{\partial t} = D\left(\frac{\partial^2 c}{\partial x^2}\right) \quad (11)$$

Taking account of the size and shape of the sample and assuming that the coefficient of diffusion is concentration-independent, Crank [see above] calculated some numerical solutions. For swelling bodies assuming the form of a sheet (thickness d=2·a), the following equation is used:

$$\frac{M_t}{M_\infty} = \quad (12)$$

$$1 - \sum_{n=0}^{\infty} \frac{8}{(2n+1)^2 \pi^2} * \exp(-(2n+1)^2\left(\frac{\Pi^2 Dt}{4a^2}\right) = \frac{2}{\sqrt{\Pi}} * \sqrt{\frac{D*t}{a^2}}$$

M corresponds to the amount of solvent absorbed at a time t, and M∞ to the amount absorbed in the equilibrium state. The second part of the term corresponds to an approximation. The plot of M/M∞ against √t gives the coefficient of diffusion D from the initial slope.

For MMT-based nanocomposites of the invention, significantly smaller coefficients of diffusion were obtained than from mechanically mixed samples according to EP 2 168 918 A1. In order to attain the same coefficients as by means of the CDLC method which is especially preferred in accordance with the invention, 6 times the amount of mechanically mixed sheet silicate was needed!

The coefficients of diffusion can be used, according to Nielsen [L. E. Nielsen, J. Macromol. Sci., A1 (1967) 929], to calculate the aspect ratio $\alpha$ of the sheet silicates in the MMT-based nanocomposite. The silicate platelets in the polymer matrix form barriers for the penetrating molecules and hence extend the diffusion pathway.

The relative coefficient of diffusion $D_f/D_o$ can be expressed by equation (13).

$$\frac{D_f}{D_0} = \left(\frac{1}{1 + \alpha \phi}\right) \quad (13)$$

A summary of the aspect ratios obtainable from swelling measurements is shown for the systems examined in tab. 14.

TABLE 14

| Aspect ratios | | | |
|---|---|---|---|
|  | EP2168918A1 | DE102007048995A1 | Inventive; CDLC method |
| Primary latex | | | |
| NBR 1 | 9 | 40 | 150 |
| NBR 2 | 9 | 40 | 150 |
| NBR 3 | 9 | 45 | 150 |
| E-SBR (23% styrene) | 8 | 35 | 70 |
| E-SBR (33% styrene) | 9 | 35 | 80 |
| E-SBR (40% styrene) | 10 | 40 | 85 |
| NR | 11 | 45 | 110 |
| Secondary latex | | | |
| XHNBR | 9 | 45 | 150 |
| XNBR (carboxylated NBR with about 30% ACN from Eliochem) | 9 | 40 | 120 |
| S-SBR (Buna VSL 2525-0) | 8 | 35 | 75 |
| S-SBR (Buna VSL 5025-2 HM) | 9 | 35 | 75 |
| Amino S-SBR (Buna VSL VP PBR4057) | 9 | 40 | 80 |
| Carboxylatad S-SBR (Buna VSL VP PBR4088 RJ) | 10 | 45 | 85 |
| Butyl 101-3 | 9 | 35 | 80 |
| Halobutyl Lanxess X_Butyl BB2030 | 10 | 35 | 90 |

Tab. 14 shows the highest aspect ratios in each case for vulcanizates comprising nanocomposites produced in accordance with the invention. In addition, the results make it clear that there is virtually no difference in relation to the aspect ratio between primary latex and secondary latex.

4. Production of the Rubber Mixtures and Formulations for the Performance Tests 4.1 Production of the Rubber Mixtures 4.1.1 Production of the Rubber Mixtures for the Vulcanizates According to Tabs. 15 to 18 Below The rubber mixtures were produced in a two-stage mixing process, in each case using an internal mixture of capacity 1.5 l (GK 1,5 from Werner & Pfleiderer, Stuttgart) with intermeshing kneading elements (PS 5A paddle geometry) for the first mixing stage. The 2nd mixing stage was conducted on a thermostatable roller at a maximum roller temperature of 60° C.

The mixture constituents used were each based on 100 parts by weight of oil-free rubber matrix. The addition sequence of the mixture constituents and the times of addition are shown in the tables corresponding to the individual mixing series. In tabs. 16 to 18 and tabs. 19 to 21, the mixture constituents that were metered in the first mixing step were identified by *, while the mixture constituents that were metered in the second mixing step (or later mixing steps) are identified by **.

In the first mixing step, the mixture constituents listed in tabs. 16 to 18 were introduced into the internal mixer heated to 70° C. and mixed at a fill level of 72%, at a ram pressure of 8 bar and a kneader speed of 70 revolutions per min. To ensure sufficient dispersion, the mixtures were heated to the temperatures specified in tab. 15 by increasing the speed and kept at these temperatures until ejection from the internal mixer. Thereafter, the mixtures were ejected and cooled to <90° C. on a roller.

After storage at 23° C. for 24 hours, the mixtures were redispersed in a second mixing stage in the internal mixer, optionally after addition of further components (filer level: 72%, ram pressure: 8 bar, speed of rotation: 50 min$^{-1}$) and ready-mixed until attainment of the ejection temperature. Thereafter, the mixture was ejected and cooled to <60° C. on a roller preheated to 40° C.

Alternatively, it was possible to add the crosslinking chemicals in a second mixing stage on the roll at temperatures of not more than 60° C.

4.1.2 Process for Producing Vulcanizates:

The vulcanization for production of products of the invention comprising nanocomposites of the invention was typically effected at a temperature in the range from 100 to 250° C., either under standard pressure (1 bar) or optionally at a pressure of up to 300 bar.

It is found that nanocomposites of the invention are of excellent suitability for production of rubber-based products or vulcanizates, or elastomers.

4.2 Formulations

If required, for comparative purposes, the sodium montmorillonite (MMT) for use as sheet silicate was mixed in powder form in the internal mixer.

TABLE 15

Mixing procedure

| Mixing stage 1 (time in seconds) | Material/operation |
|---|---|
| 0-60 | Polymer |
| 60-180 | (⅔) carbon black, aging stabilizer, stearic acid, plasticizer |
| 180-300 | (⅓ carbon black), ZnO, (½ MMT) |
| 300-360 | (½ MMT) |
| 360-600 | Mixing |
| 600 | Ejection |

The mixture production of the NBR types was effected with the aid of two different formulations (tab. 16, tab. 17). Firstly, a base formulation that only the essential constituents needed for crosslinking was used. The amount of MMT was varied within the range from 0% to 5.2% by volume. The second formulation was adjusted for industrial purposes and supplemented with aging stabilizers and plasticizers (tab. 17). Here too, the amount of MMT was varied within the range from 0% to 5.2% by volume. In the case of HXNBR, peroxidic vulcanization was chosen owing to the hydrogenated double bonds. The formulation is specified in tab. 18. The amount of MMT was varied within the range from 0% to 5.2% by volume. In tab. 19, tab. 20 and tab. 21, there are additionally examples of IIR and SBR.

TABLE 16

Formulation based on NBR1

| Component | phr |
|---|---|
| NBR*, various | 100 |
| Sodium montmorillonite* | variable |
| Sulfur** | 2 |
| CBS** | 1 |
| Stearic acid* | 0.8 |
| ZnO* | 5 |

The amount of MMT was varied within the range from 0% to 5.2% by volume.

TABLE 17

Formulation 2, industrial formulation

| Component | phr |
|---|---|
| NBA*, various | 100 |
| Sodium montmorillonite* | variable |
| Carbon black* | variable |
| Stearic acid* | 0.5 |
| Rhenogran ® IS 60-75** | 0.37 |
| ZnO aktiv* | 5 |
| Vulkanox ® HS/LG* | 1.5 |
| Volkanox ® MB2/MB* | 1.5 |
| Vulkanol ® OT* | 10 |
| Vulkacit ® NZ/EGC** | 1.5 |
| Rhenogran ® TBzTD-70** | 3.5 |
| Vulkalent ® E/C** | 1 |

The amount of MMT was varied within the range from 0% to 5.2% by volume.

TABLE 18

Formulation 3: HXNBR

| Component | phr |
|---|---|
| HXNBR* | 100 |
| Sodium montmorillonite* | variable |
| Vulkanox ® 4020* | 1.5 |
| Magnesium oxide* | 5 |
| Palatinol ® TOTM** | 5 |
| Vulcofac ® TAIC 70** | 1.5 |
| Struktol ® ZP 1014** | 7 |
| Perkadox ® BC-40** | 7 |

The amount of MMT was varied within the range from 0% to 5.2% by volume.

CBS Vulkacit® CZ/EG-C, N-cyclohexyl-2-benzothiazole-sulfenamide [CAS No. 95-33-0]

Palatinol® TOTM trioctyl trimellitate [CAS No. 3319-31-1], BASF SE, Ludwigshafen Vulcafac® TAIC 70 triallyl isocyanurate [CAS No. 1025-15-6], West Coast Polychem Pvt. Ltd., Mumbai, India Structol® ZP 1014 zinc peroxide preparation with active content 50% (ZnO$_2$, ZnO), 30% inorganic dispersant and 20% organic dispersant, Schill+Seilacher "Struktol" GmbH, Hamburg Perkadox® BC-40 dicumyl peroxide [CAS No. 80-43-3] with 40% active ingredient, AkzoNobel Functional Chemicals, Amersfoort, the Netherlands Vulcanox® 4020 N-(1,3-dimethylbutyl)-N'-phenyl-p-phenylenediamine (6PPD), [CAS No. 793-24-8], Lanxess Deutschland GmbH, Cologne Vulcanox® HS/LG 2,2,4-trimethyl-1,2-dihydroquinoline, polymerized (TMQ), [CAS No. 147-47-7], Lanxess Deutschland GmbH, Cologne Vulcanox® MB2/MB 4- and 5-methyl-2-mercaptobenzimidazole (MMBI), [CAS Nr. 53988-10-6], Lanxess Deutschland GmbH, Cologne Vulcanol® OT ether thioether, Lanxess Deutschland GmbH, Cologne Vulkacit® NZ/EGC N-tert-butyl-2-benzothiazolesulfenamide (TBBS), [CAS No. 95-31-8], Lanxess Deutschland GmbH, Cologne Rhenogran® TBzTD-70 tetrabenzylthiuram disulfide [CAS No. 10591-85-2], RheinChemie Rheinau GmbH, Mannheim Vulkalent® E/C N-(trichloromethylthio)benzenesulfanilide, [CAS No. 002280-49-1]Lanxess Deutschland GmbH, Cologne HXNBR THERBAN® XT VPKA 8889 hydrogenated carboxylated butadiene acrylonitrile terpolymer [CAS No. 187041-37-8]
ZnO aktiv Zinkoxyd aktiv®, fine zinc oxide powder
ZnO Rotsiegel zinc white (Grillo Zinkoxid GmbH)
Stearic acid Edenor® C 18 98-100 (Cognis Deutschland GmbH), CAS Number 57-11-4
Vulkacit® CZ N-cyclohexyl-2-benzothiazolesulfenamide, CBS
Sulfur soluble sulfur (Chancel® 90/95° ground sulfur (Solvay Barium Strontium))
Perbunan® 3445 F butadiene-acrylonitrile copolymer, Lanxess Deutschland GmbH
Perbunan® 3430 F butadiene-acrylonitrile copolymer, Lanxess Deutschland GmbH
Krynac® 4450 F butadiene-acrylonitrile copolymer, Lanxess Deutschland GmbH
Lanxess Butyl 101-3 isobutylene-isoprene copolymer, Lanxess Deutschland GmbH
Lanxess X_Butyl BB 2030 halogenated isobutylene-isoprene copolymer, Lanxess Deutschland GmbH
N550 carbon black Statex® N550 (Columbian Carbon Deutschland)
Sunpar® 2280 "Highly refined paraffinic type rubber process oil by Sunoco"
MBTS Vulkacit® DM, Lanxess Deutschland GmbH
Vulkanox® BKF 2,2'-methylenebis(4-methyl-6-tert-butylphenol); Lanxess Deutschland GmbH

TABLE 19

| IIR formulation | |
|---|---|
| Component | phr |
| Lanxess ® Butyl 101-3* | 100 |
| Sodium montmorillonite* | variable |
| Sunpar ® 2280* | 5 |
| ZnO* | 5 |
| Stearic acid* | 1 |
| Sulfur** | 1.5 |
| MBTS** | 1.5 |

The amount of MMT was varied within the range from 0% to 5.2% by volume.

TABLE 20

| IIR formulation | |
|---|---|
| Component | phr |
| Lanxess ® X_Butyl BB 2030* | 100 |
| Sodium montmorillonite* | variable |
| Sunpar ® 2280* | 5 |
| ZnO* | 5 |
| Stearic acid* | 1 |
| Sulfur** | 1.5 |
| MBTS** | 1.5 |

The amount of MMT was varied within the range from 0% to 5.2% by volume.

TABLE 21

| SBR formulation based on secondary latex S-SBR composite: | |
|---|---|
| Component | phr |
| Buna ® VSL 2525-0* | 100 |
| Sodium montmorillonite* | variable |

TABLE 21-continued

| SBR formulation based on secondary latex S-SBR composite: | |
|---|---|
| Component | phr |
| Sunpar ® 2280* | 5 |
| ZnO* | 3 |
| Stearic acid* | 1 |
| Sulfur** | 2 |
| CBS** | 1.3 |
| DPG** | 1 |

The amount of MMT was varied within the range from 0% to 5.2% by volume.

L-styrene-butadiene rubber as base for sodium montmorillonite composite:
Buna® VSL 2525-0: butadiene-styrene copolymer, Lanxess Deutschland GmbH
Buna® VSL 5025-2 HM butadiene-styrene copolymer oil-extended, Lanxess Deutschland GmbH
Buna® VSL VP PBR 4057 aminated butadiene-styrene copolymer oil-extended, Lanxess Deutschland GmbH
Buna® VSL VP PBR 4088 carboxylated butadiene-styrene copolymer oil-extended, Lanxess Deutschland GmbH
Tab. 22 Shows a Natural Rubber Formulation

| Composition of the formulation | Dosage in phr |
|---|---|
| NR-Clay Composite | 101-103 |
| N550 carbon black | 0-50 |
| Vivatec ® 500 | 4 |
| Aktiplast ® PP | 3 |
| Vulkanox ® 4020/LG | 2 |
| Vulkanox ® HS/LG | 1.5 |
| Antilux ® 654 (RheinChemie) | 1 |
| EDENOR ® C 18 98-100 | 1 |
| Rotsiegel zinc white | 3 |
| 90/95 ground sulfur | 2.5 |
| Vulkacit ® CZ/C | 1.5 |
| Vulkacit ® D/C | 0.5 |

The natural rubber latex from NR-Clay Composite was sourced as commercially available Latex NR-Latex FA from Weber & Schaer GmbH & Co. KG, Hamburg, Germany.

| N550 carbon black | Statex ® N550 (Columbian Carbon Deutschland) |
|---|---|
| Vivatec ® 500 | Hansen & Rosenthal KG |
| Aktiplast ® PP | RheinChemie Rheinau GmbH |
| Vulkanox ® 4020/LG | Lanxess Deutschland GmbH |
| Vulkanox ® HS/LG | Lanxess Deutschland GmbH |
| Antilux ® 654 | RheinChemie Rheinau GmbH |
| Edenor ® C18 98-100 | stearic acid, CAS No. 57-11-4, Cognis Deutschland GmbH |
| Rotsiegel ZnO | Grillo Zinkoxid GmbH |
| 90/95 ground sulfur | Deutsche Solvay-Werke |
| Vulkacit ® CZ/C | Lanxess Deutschland GmbH |
| Vulkacit ® DZ/C | Lanxess Deutschland GmbH |

4.5 Producing the Vulcanizates:

The vulcanization characteristics of the mixtures were studied in a rheometer to DIN 53 529 with the aid of the MDR 2000E Monsanto rheometer. In this way, characteristic data such as $F_{min}$, $F_{max}$, $F_{max}$-$F_{min}$, t10, t50, t90 and t95, and also $F15_{min}$, $F20_{min}$ $F25_{min}$ and $F25_{max}$-$F_{min}$ were determined.

Definitions according to DIN 53 529, Part 3 are:
$F_{min}$: vulcameter reading at the minimum of the crosslinking isotherm $F_{max}$: vulcameter reading at the maximum of the crosslinking isotherm $F_{max} - F_{min}$: difference in the vulcameter readings between maximum and minimum t10: time at which 10% of the conversion has been attained
t50: time at which 50% of the conversion has been attained
t90: time at which 90% of the conversion has been attained
t95: time at which 95% of the conversion has been attained The specimens needed for the vulcanizate characterization were produced by press vulcanization of the mixtures at a hydraulic pressure of 120 bar. The various specimens were each vulcanized up to t90 times calculated with addition of 1 min per mm of sample thickness. Prior to the characterization of the vulcanized samples, they were left to stand for 24 hours.

5. Effect of MMT in Hybrid Systems 5.1 Characterization of Hybrid and Conventional Systems For classification of the strengthening and swelling properties of the MMT-based nanocomposites of the invention, especially from the CDLC method of the invention, comparative compounds were produced with N550 carbon black and mechanically mixed-in sheet silicate and characterized. In addition, hybrid systems were produced from masterbatches based on MMT-based nanocomposites by the process of the invention, especially the CDLC method, with up to 5.2% by volume of exfoliated sheet silicate and according to the prior art in combination with conventional filers such as carbon black. In the case of these mixtures, the masterbatches were treated like fillers and each incorporated in the first mixing stage.

The formulation is shown in tab. 23. It was extended with N 550 carbon black (40 phr, 60 phr and 80 phr). The amounts of MMT were varied such that 0%, 1% and 2% by volume of MMT were present in the final mixture.

TABLE 23

| | |
|---|---|
| NBR 3445 F | 100 |
| Masterbatch - NBR* | |
| Sodium montmorillonite* | variable |
| N550 carbon black* | variable |
| Stearic acid* | 0.5 |
| Rhenogran ® IS 60-75** | 0.37 |
| ZnO aktiv* | 5 |
| Vulkanox ® HS/LG* | 1.5 |
| Vulkanox ® MB2/MG* | 1.5 |
| Vulkanol ® OT* | 10 |
| Rhenogran ® TBzTD-70* | 3.5 |
| Vulkalent ® E/C* | 1 |

The amount of MMT was varied within the range from 0% to 5.2% by volume. The amount of carbon black was varied within the range from 0% to 31% by volume. In tab. 23 too, the mixture constituents that were metered in the first mixing step were identified by *, while the mixture constituents that were metered in the second mixing step (or later mixing steps) are identified by **.

| | |
|---|---|
| Rhenogran ® IS 60-75 | sulfur-based vulcanizing agent for natural and synthetic rubber mixtures, RheinChemie Rheinau GmbH, Mannheim |

5.2 Viscoelastic Properties of Uncrosslinked Systems

The viscoelastic properties of nanocomposite-filled rubber products according to the compositions described in 5.1 tab. 23 were characterized in a rubber process analyzer (from Alpha Technologies, model: Monsanto RPA 2000; measurement conditions: 80° C., measurement frequency 1 Hz, deformation amplitude of 0.28% to 400%).

For this purpose, the storage modulus of MMT-based nanocomposites obtainable by mechanical mixing according to EP 2 168 918 A1 and the storage modulus of MMT-based nanocomposites obtainable from the CDLC method with N550 carbon black were plotted in a log-log plot against the filler volume content of the MMT, as a result of which the percolation thresholds in the uncrosslinked state became clear. In the case of use of MMT-based nanocomposites obtainable by the CDLC method, it was possible to detect a change in the slope of the storage modulus at 1.6% by volume. This result is attributable to the formation of a filler network. By contrast, the percolation threshold for MMT-based nanocomposites obtainable from mechanically mixed-in sheet silicates according to EP 2 168 918 A1 is 10% by volume, and hence shifted by a factor of six toward higher volume fractions. N550 carbon black showed similar viscoelastic characteristics to mechanically mixed-in sheet silicate. The buildup of a filler network commenced at about 13% by volume in the uncrosslinked state.

Figure 6:
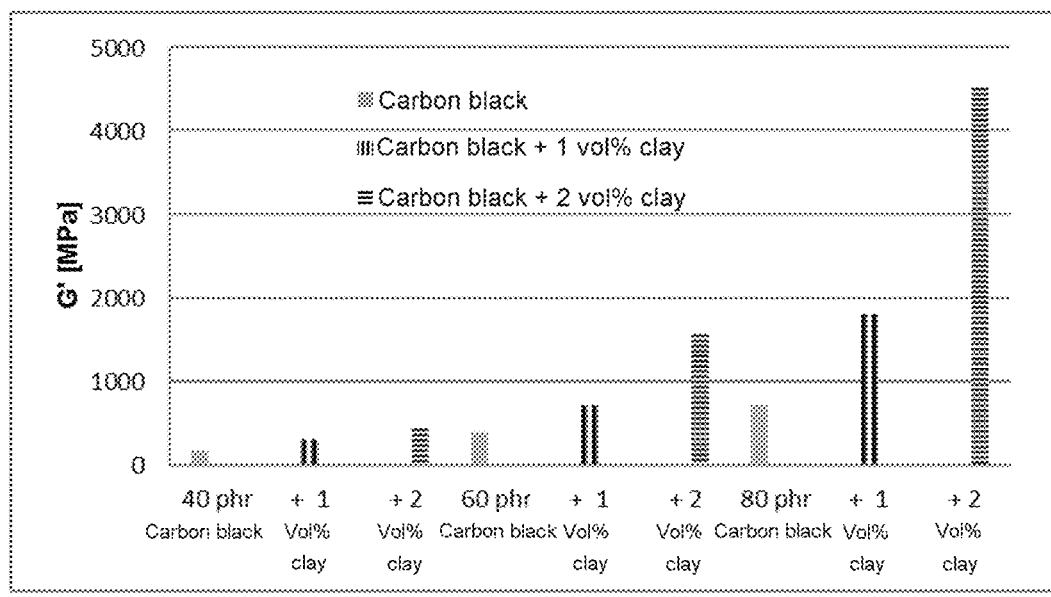
FIG. 6 is a graph depicting the effect on storage modulus as a function of volume percentage.

FIG. 6 shows the evolution of the storage modulus in the carbon black/sheet silicate hybrid systems examined. The hybrid systems were obtained with 40 phr of carbon black (corresponding to 14% by volume), 60 phr of carbon black (corresponding to 21% by volume) and 80 phr of carbon black (corresponding to 26% by volume), by addition of 2.5 phr (corresponding to 1% by volume) and 5.3 phr (corresponding to 2% by volume) of MMT in each case. These small additional dosages of sheet silicate achieved surprising and significant increases in the storage moduli. The addition of 1% by volume or 2% by volume of sheet silicate in the form of a masterbatch comprising nanocomposites produced by CDLC methods achieved storage moduli up to six times higher. A compound with 60 phr of N 550 carbon black and with 1% by volume of sheet silicate in the form of a masterbatch comprising nanocomposites produced by CDLC methods led to a storage modulus comparable to an 80 phr carbon black mixture. In the case of the higher carbon black contents in rubber-based products that are customary in practice, 1% by volume (2.5 phr) of sheet silicate in the form of nanocomposites by CDLC methods can thus replace 20 phr of carbon black.

5.3 Mechanical Properties of Crosslinked Systems 5.3.1 Shore A Hardness

The addition of fillers in rubbers generally leads to a proportional increase in the Shore A hardness (DIN 53505, measurement at 23° C.) and is known per se in the rubber industry.

Figure 7:
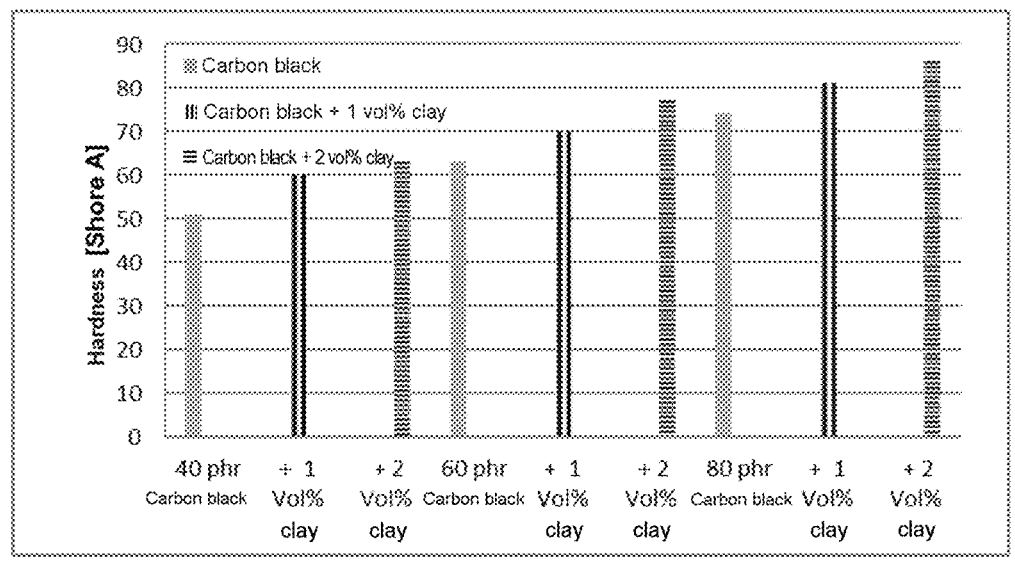
FIG. 7 is a graph depicting the effect on Shore A hardness as a function of volume percentage.

In the case of use of inventive MMT-based nanocomposites, in the context of the present invention, increases in Shore A hardness were achieved by surprisingly small increases in the proportion by volume in the elastomers. MMT-based nanocomposites obtained by mechanical mixing according to EP 2 168 918 A1 showed similar increases in the Shore A hardness to N550 carbon black. The same hardnesses were achieved with 3% by volume of sheet silicate (by CDLC methods) as with 21% by volume of N550 carbon black. The high strengthening is the result of the particularly high degree of individualization and dispersion of the sheet silicates achieved by the process of the invention. As a result of the aspect ratio achieved and the resulting specific surface area of the individualized silica platelets, an interface of physisorbed polymer chains formed at the surface of these sheet silicates. The elevated density in this boundary region led to an increase in hardness of the material containing the nanocomposites of the invention in the form of elastomers or vulcanizates. According to FIG. 7, an increase in the Shore A hardness by 20 units was actually achieved when 1.6% by volume of sheet silicate, exfoliated by the process of the invention, especially the CDLC method, was used.

2.5 phr (=1% by volume) and 5.3 phr (=2% by volume) of sheet silicate was added to the mixtures comprising 40 phr, 60 phr and 80 phr of carbon black, as a masterbatch in the form of a nanocomposite obtainable by CDLC methods. The resulting hybrid systems showed significant increases in hardness of up to 14 hardness points, which were achieved by these small amounts of sheet silicate in the form of a nanocomposite according to the CDLC method. By comparison with solely carbon black-filled vulcanizates, an addition of 1% by volume of the nanocomposite obtainable by CDLC methods gave a vulcanizate that exhibited a rise by 7-9 Shore A units. In the case of addition of 2% by volume of sheet silicate in the form of a nanocomposite from the CDLC method, a rise by 12-14 Shore A units was found. This is an increase of up to 20%!

The results again show the exceptional strengthening potential of extremely individualized sheet silicates as obtained by the process of the invention.

5.3.2 Mechanical-Dynamic Properties

By logarithmic plotting of the values determined for sheet silicate-containing systems, of carbon black-containing systems and/or carbon black together with sheet silicate-containing systems, the mechanical-dynamic properties of the different systems were represented for comparative purposes. The mechanical percolation thresholds were found from the point of intersection of the two straight lines which resulted from power functions with different exponents; see FIG. 8.

Figure 8:
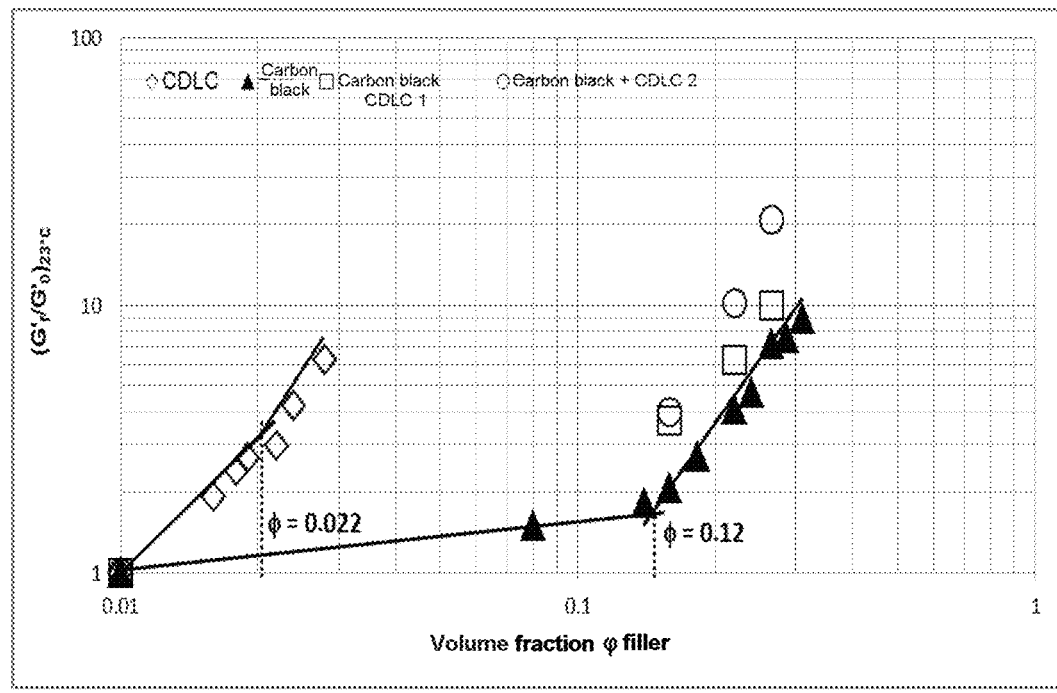
FIG. 8 is a graph depicting shows the determination of the mechanical percolation thresholds and the dynamic strengthening on carbon black materials, sheet silicate materials and mixed materials.

FIG. 8 shows the determination of the mechanical percolation thresholds and the dynamic strengthening on carbon black materials, sheet silicate materials and mixed materials.

Nanocomposites comprising sheet silicate obtainable by the process of the invention showed very low percolation thresholds of 2.2% by volume, whereas nanocomposites comprising N 550 carbon black required a five-fold increase in the proportion by volume of filler to attain the mechanical percolation limit. In order to achieve these storage moduli with N550 carbon black as well, proportions by volume 7.5 times higher were necessary in the case of carbon black than with MMT exfoliated in accordance with the invention in the form of nanocomposites of the invention.

Compounds with similar strengthening were characterized with the aid of a servohydraulic elastomer test system from MTS, model 831.50, as a function of an extension amplitude of 0.2% to 400% at room temperature and a frequency of 1 Hz. The carbon black-filled sample, with a storage modulus of about 3.5 MPa, was higher by a factor of 4 compared to the unfilled rubber. The additional addition of 1% by volume of MMT in the form of a nanocomposite produced in accordance with the invention brought about a rise in the storage modulus to a value of 5 MPa. The addition of 2% by volume of MMT in the form of a nanocomposite produced in accordance with the invention led to doubling in the storage modulus compared to the solely carbon black-filled sample. Very small additions of sheet silicate led to surprisingly significant changes in the stiffness of the vulcanizates examined, and to a very large increase in the storage modulus.

5.3.3 Stress/Strain Characteristics

The exceptional strengthening potential of nanocomposite of the invention with homogeneous distribution thereof in the vulcanizate was especially shown in the stress/strain characteristics in specimens, measured in accordance with DIN 53504: stress values at 10%, 25%, 50%, 100%, 200% and 300% strain ($\sigma10$, $\sigma25$, $\sigma50$, $\sigma100$, $\sigma200$ and $\sigma300$), tensile strength and elongation at break at 23° C. and a pulling speed of 200 mm/min and an initial force of 0.5 N in a Zwick 1445 material testing machine with the S2 sample geometry—and the strengthening factors determined from the measurement curves by comparison with carbon black-based mixtures.

Figure 9:
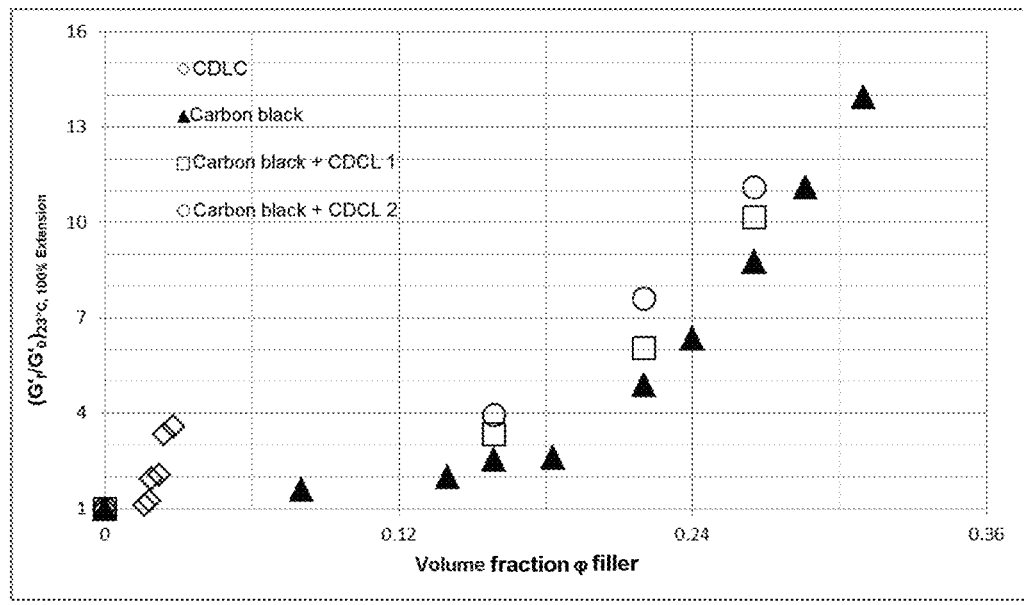
FIG. 9 is a graph depicting strengthening factors of carbon black materials, sheet silicate materials and mixed materials at 100% extension.

The hybrid systems composed of N550 carbon black and nanocomposites of the invention again led to distinctly increased strengthening factors. FIG. 9 shows strengthening factors of carbon black materials, sheet silicate materials and mixed materials at 100% extension.

Figure 10:
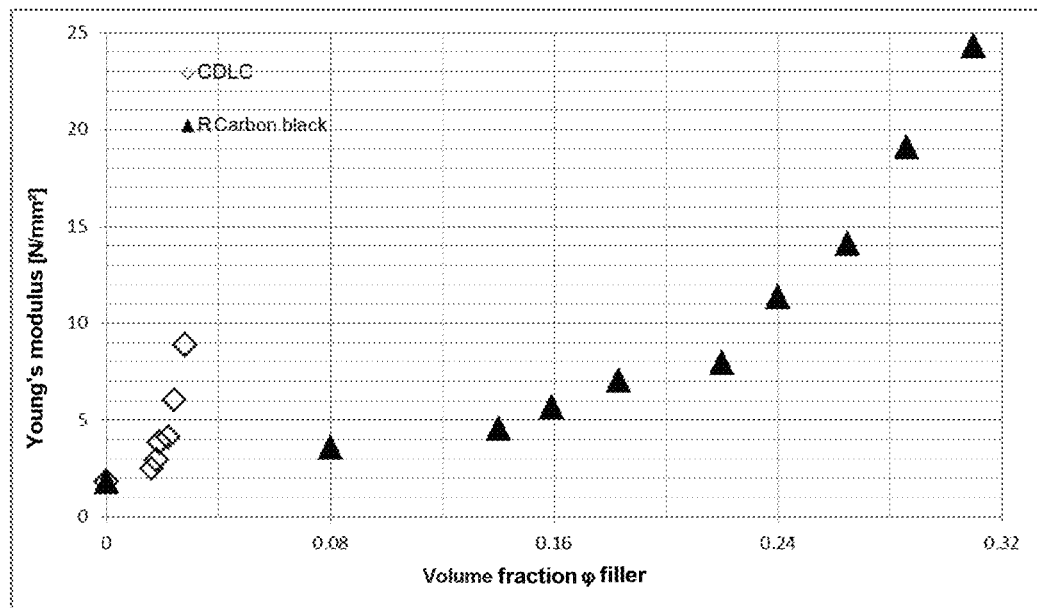
FIG. 10 is a graph depicting Young's moduli at 2WC for materials comprising carbon black compared to materials comprising MMT-based nanocomposites in which the nanocomposite has been produced in accordance with the invention.

The strengthening factors of vulcanizates at 100% elongation showed significant strengthening of the samples with nanocomposites of the invention. The same factor as 3% by volume of MMT-based nanocomposites of the invention was only achieved with 16% by volume of noninventive MMT-based nanocomposites from mechanical exfoliation according to EP 2 168 918 A1 or even only with 19% by volume of N550 carbon black. In the region of very small extensions, stress increased in a linear manner relative to strain. The slope of the increase is a measure of the stiffness of the material and is referred to as Young's modulus. FIG. 10 shows Young's moduli at 23° C. for materials comprising carbon black compared to materials comprising MMT-based nanocomposites in which the nanocomposite has been produced in accordance with the invention.

There was also a rise in the Young's modulus proportionally to the proportion by volume, similarly to the strengthening factor. In the experiments, there was a much greater increase in the slope of the Young's modulus in vulcanizates comprising MMT-based nanocomposites of the invention than in the case of vulcanizates that were additized with nanocomposites in which the MMT had been exfoliated beforehand by prior art methods. The high aspect ratio and good dispersion, in the case of use of nanocomposites of the invention, led to high stiffnesses in vulcanizates, probably as a result of higher polymer-filler interactions.

5.3.4 Polymer-Filler Interaction

The strengthening properties of sheet silicates in the polymeric matrix in vulcanizates can be appreciated via the marked polymer-filler interaction. The interaction results in a boundary layer in which the polymer chains are bound to the surface of the sheet silicate owing to physical forces. The chain mobility is very limited as a result and the reduced mobility can be detected by nuclear resonance spectroscopy. The boundary layer leads to an increase in density of the polymer in these regions. The more boundary layer is present, the lower the swelling in these regions. A very substantially optimal boundary layer is accordingly influenced/achieved by the exfoliation of the sheet silicate and substantial individualization of the silicate platelets of the sheet silicate.

5.3.5 Swelling Characteristics

Figure 11:
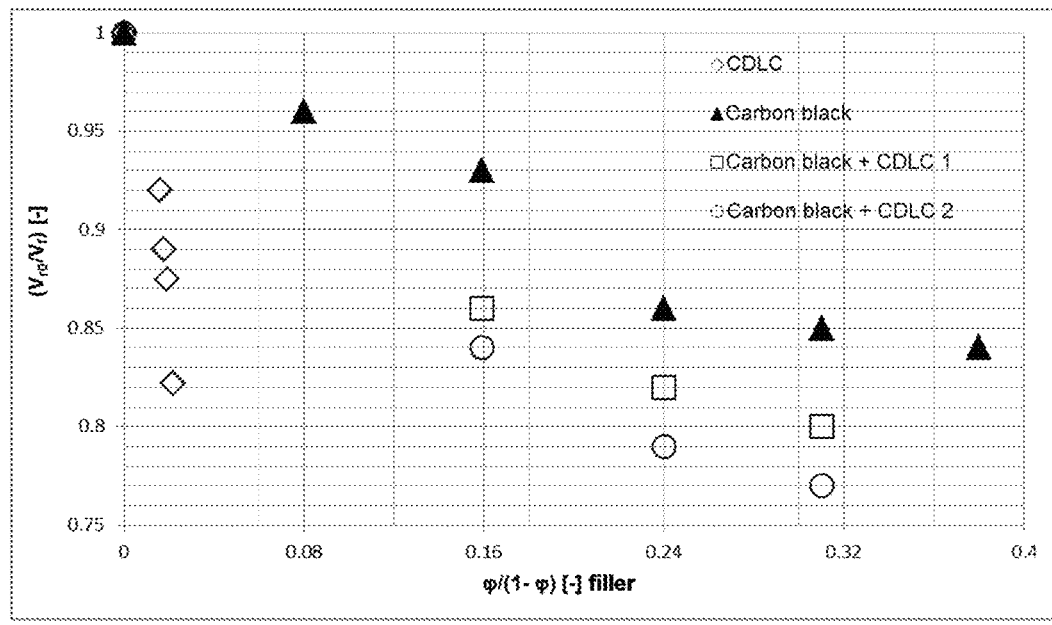
FIG. 11 shows Kraus plots for a system exfoliated by the CDLC method which is particularly preferred in accordance with the invention compared to carbon black systems and hybrid systems.

The swelling characteristics of MMT-based nanocomposites of the invention and of MMT-containing composites exfoliated by mechanical mixing (according to EP 2 168 918 A1) and of carbon black mixtures and hybrid systems thereof were examined in methyl ethyl ketone (MEK) at room temperature. For this purpose, the samples were weighed in the dry state and immersed into the swelling medium, and the increase in weight was determined daily by weighing. The swelling medium was changed every two days. To determine the coefficients of diffusion, the samples were analyzed and evaluated with a Reyence VHX-600 digital microscope. The evaluation of the swelling measurements was effected with the aid of the Kraus equation [Kraus G., J. Appl. Polym. Sci. 7 (1963), 861]. In a Kraus plot of the systems examined, the slope is a measure of the polymer-filler interaction. FIG. 11 shows Kraus plots for a system exfoliated by the CDLC method which is particularly preferred in accordance with the invention compared to carbon black systems and hybrid systems.

The highest slope values were achieved with MMT-based nanocomposites of the invention. The Kraus constant C was calculated by the above equation. The higher the value of C, the more marked the interaction between polymer and filler. In nanocomposites obtainable by the CDLC method, the Kraus constant C was found to be 7.7. For nanocomposites obtainable by mechanical mixing according to EP 2 168 918 A1, C=2.6 was obtained. The interaction was thus increased by a factor of 3 for MMT-based nanocomposites of the invention. The results were much lower for carbon black-containing mixtures with a Kraus constant C=1.6. The hybrid systems based on composites with 1% by volume (corresponding to 2.5 phr) and 2% by volume (corresponding to 5.3 phr) of nanocomposites produced by CDLC methods showed a distinct reduction in swelling with distinctly improved barrier properties compared to the carbon black-based mixtures. 2% by volume of MMT in the form of nanocomposite of the invention brought about an increase in the polymer-filler interaction by a factor of about 2.

5.3.6 $^1$H NMR

Figure 12:
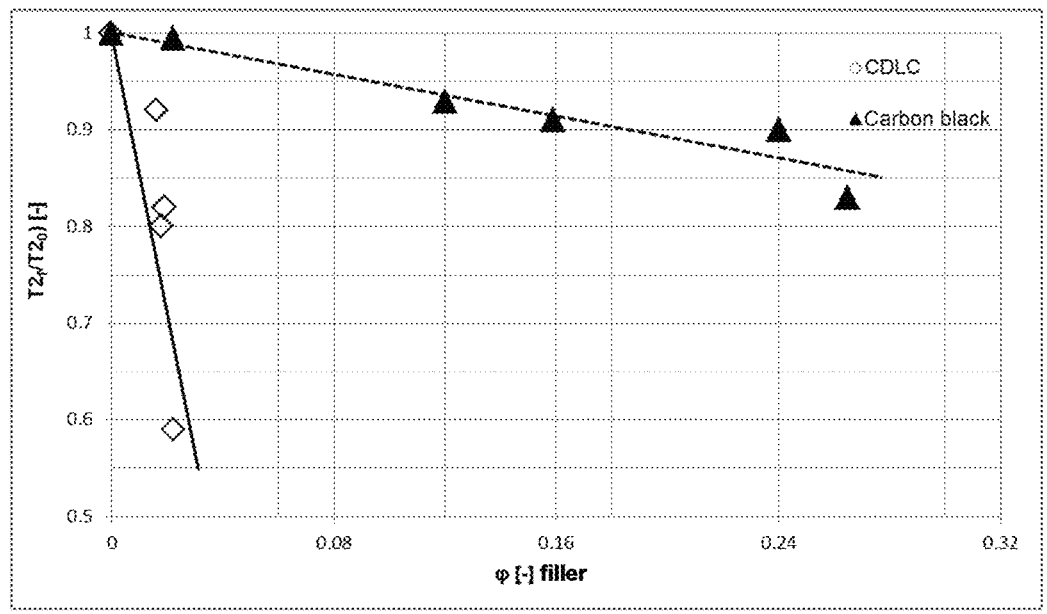
FIG. 12 shows the relative spin-spin relaxation time T2 for inventive systems produced by CDLC methods and carbon black systems.

The mobility of the chain segments resulting from the physical attachment to the filler surface was determined by means of nuclear resonance spectroscopy. The spin-spin relaxation constant T2 means the time after a 90° pulse at which cross-magnetization has dropped to 37% of its starting value. The lower this value, the lower the chain mobility. FIG. 12 shows the relative spin-spin relaxation time T2 for inventive systems produced by CDLC methods and carbon black systems.

The different slopes in the relative spin-spin relaxation times depending on the filler volume fractions showed the significant change in stiffness for the vulcanizates based on inventive MMT-based nanocomposites obtainable by CDLC methods compared to those based on N550 carbon black. The same polymer chain mobility as a 3% by volume of MMT in the form of inventive nanocomposites obtainable by CDLC methods was only achieved when 25% by volume of N550 carbon black was used instead.

The results from FIG. 12 also again surprisingly show, for MMT-based nanocomposites of the invention, distinct and positive changes in properties of the vulcanizates obtainable therefrom at significantly lower volume fractions compared to conventionally obtainable fillers.

6. Explosive Decompression

Explosive decompression experiments are employed particularly in the field of gasket materials. These are primarily gasket materials which have to provide sealing against gaseous media when the pressure is lowered from a high to a low pressure level within a few seconds.

The explosive decompression tests were conducted in the context of the present invention in an autoclave under pressure (50 bar) and elevated temperature (50° C.) by placing a sample of a vulcanizate into liquid $CO_2$ in a pressure vessel. The conditions were as follows: after storage at 50° C. and 50 bar for 2.5 h, the pressure was released completely within fewer than 5 seconds, which caused the carbon dioxide to be converted to a gaseous state. After the pressure release, the gas dissolved in the polymer diffused out of the sample. Remaining gas molecules collected at weak points in the sample and expanded, such that bubbles or cracks formed in the sample. The assessment of the samples in respect of explosive decompression, in the context of the present application, was effected visually with reference to the amounts of bubbles and cracks in the sample within a period of 0 to 60 minutes.

For the studies, inventive nanocomposite obtainable by CDLC methods in Krynac® 4450 F with silica/silane was used, with an NaMMT content of 2.25% by volume. The reference sample used was a silica/silane vulcanizate without sheet silicate which is used industrially as gasket material, especially in the field of the oil and gas industry, and is supposed to withstand the demands of explosive decompression. The formulation is stated in tab. 24.

TABLE 24

| Component | phr | phr |
| --- | --- | --- |
| Krynac® 4450 F*[2] | 100 | 100 |
| Sodium montmorillonite | 0 | 6 |
| Stearic acid | 1 | 1 |
| Maglite® DE | 2 | 2 |
| ZnO aktiv | 2 | 2 |
| Rhenofit® DDA-70 | 1 | 1 |
| Vulkanox® ZMB2/C-5 | 0.4 | 0.4 |
| Diplast® TM8-10/ST | 5 | 5 |
| Polyglykol 4000 S | 2 | 2 |
| Celite® 281 SS | 105 | 105 |
| Vulkasil® S | 25 | 25 |
| Sachtleben RU-5 | 5 | 5 |
| Silquest® RC-1 | 3 | 3 |
| Rhenofit® TRIM/S | 4 | 4 |
| Perkadox® 14-40-B-PD | 3 | 3 |

*[2]Also metered in analogously were Perbunan 3445 F, Perbunan 3430 F, Therban XT VP and carboxylated NBR with about 30% ACN from Eliochem (ACN = acrylonitrile).

6.1 Feedstocks

| | |
| --- | --- |
| Krynac® 4450 F | butadiene-acrylonitrile copolymer, Lanxess Deutschland GmbH, Cologne |
| Stearic acid | CAS No. 57-11-4 |
| Maglite® DE | magnesium oxide, from Merck, USA |
| Zinkoxid aktiv | CAS No. 1314-13-2, Lanxess Deutschland GmbH, Cologne |
| Rhenofit® DDA-70 | antioxidant composed of 70% diphenylamine derivatives and 30% filler, RheinChemie Rheinau GmbH, Mannheim |
| Vulkanox® ZMB2/C-5 | zinc salt of mercaptobenzimidazole, Lanxess Deutschland GmbH, Cologne |
| Diplast® TM8-10/ST | trimetillate based on a mixture of n-octanol and n-decanol, CAS No. 90218-76-1, Polynt, Scancorosciate, Italy |
| Polyglykol 4000 S | CAS No. 25322-69-4, Reinighaus Chemie GmbH & Co. KG, Essen |
| Celite® 281 SS | CAS No. 68855-54-9, Merck Millipore, Merck KGaA, Darmstadt |
| Vulkasil® S | CAS No. 007631-86-9, silicon dioxide, Lanxess Deutschland GmbH, Cologne |
| Sachtleben RU-5 | micronized titanium dioxide in rutile structure, Sachtleben Chemie GmbH, Duisburg |
| Silquest® RC-1 | vinyl-functionalized silane, coupling reagent, Momentive Performance Materials Inc. |
| Rhenofit® TRIM/S | crosslinking activator composed of 70% trimethylolpropane trimethacrylate [CAS No. 3290-92-4] and 30% silica, RheinChemie Rheinau GmbH, Mannheim |
| Perkadox® 14-40-B-PD | di(tert-butylperoxyisopropyl)benzene with 40% calcium carbonate and silica, CAS No. 24155-25-3, AkzoNobel Functional Chemicals, Amersfoort, the Netherlands |

6.2 Crosslinking of the Samples for the Explosive Decompression

The vulcanization properties such as incubation time, t90 and torques were determined using a rotorless torsional shear vulcameter (Rheometer MDR 2000, Alpha Technologies) according to DIN 53529, Part 3, at a heating temperature of 160° C., a frequency of 1 Hz and a deformation angle of 1.5%. In this way, characteristic data such as Fmin., Fmax., Fmax.-Fmin., t10, t50, t90 and t95, and also F15 min, F20 min. F25 min. and F25 min.-Fmax. were determined.

Definitions according to DIN 53 529, Part 3 are:

$F_{min}$: vulcameter reading at the minimum of the crosslinking isotherm $F_{max}$: vulcameter reading at the maximum of the crosslinking isotherm $F_{max} - F_{min}$: difference in the vulcameter readings between maximum and minimum t10: time at which 10% of the conversion has been attained t50: time at which 50% of the conversion has been attained t90: time at which 90% of the conversion has been attained t95: time at which 95% of the conversion has been attained The reversion characteristics were characterized by the following parameters:

$F15_{min}$: vulcameter reading after 15 min.

$F20_{min}$: vulcameter reading after 20 min.

$F25_{min}$: vulcameter reading after 25 min.

$F25_{max} - F_{min}$ difference in the vulcameter readings after 25 min and the maximum value The vulcanization was effected in a vulcanization press (KV 207.00 Rucks Maschinenbau) at 160° C. and for a vulcanization time that was calculated from the 190 times determined, plus 1 minute per mm of sample thickness. Prior to the characterization of the vulcanized samples, they were left to stand for 24 hours.

The experimental results for specimens comprising the silica/silane system without sheet silicate, directly after removal from the autoclave before and after the explosive decompression, did not show any blisters or cracks, but the samples were clearly recognizably swollen. By contrast, samples comprising nanocomposite of the invention and an NaMMT content of 2.25% by volume in the rubber exhibited very low swelling after removal from the laboratory autoclave (pressure vessel).

This shows that, through use of nanocomposites of the invention, less gas collected within the rubber of the sample and subsequently diffused out of the sample as a result of decompression. The addition of small amounts of nanocomposite of the invention therefore leads to a dearly visible improvement in the properties or to better characteristics of vulcanizates in the explosive decompression test.

Figure 13:
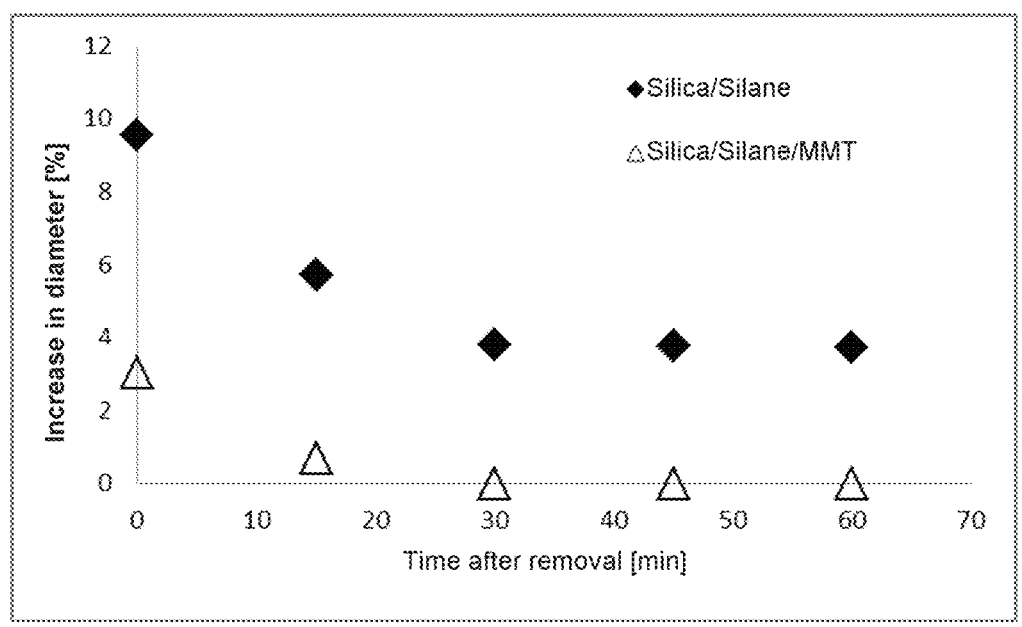
FIG. 13 is a graph depicting the effect on diameter as a function of time after removal.

FIG. 13 shows the increase in the diameter of a sample compared to the sample before the $CO_2$ test in the context of the present explosive decompression studies. As expected, there was a decrease in the diameter of the samples with increasing time at rest, since residual gas diffused out of the polymer. However, the decrease was much quicker for hybrid systems comprising nanocomposites of the invention and led back to the starting state after only 30 min. The silica/silane mixture (without MMT), by contrast, had an increase in diameter by about 4% after 60 min, because the $CO_2$ at this time had yet to diffuse completely. The asymptotic profile of the curve in FIG. 13 for the silica/silane mixture indicates irreversible material damage inside the vulcanizate. The addition of small amounts of nanocomposite of the invention to the rubber of the gasket used for the experiment led to a distinct improvement of the properties in the explosive decompression test.

TABLE 25

Permanent deformation of the vulcanizates examined after explosive decompression

| Rubber used | EP 2 168 918 A1 | DE102007048995A1 | Inventive; CDLC method |
|---|---|---|---|
| NBR1 | 3.5 | 1.8 | 0 |
| NBR2 | 3.5 | 1.9 | 0 |
| NBR3 | 3.4 | 1.8 | 0 |
| XHNBR | 3 | 1.7 | 0 |
| XNBR (carboxylatad NBA with about 30% ACN) | 3 | 1.7 | 0 |

Tab. 25 shows, for the vulcanizates comprising nanocomposites obtainable by the process of the invention, especially by the CDLC method, a distinct improvement—i.e. the avoidance of permanent deformation of the vulcanizates— compared to vulcanizates which have been additized with nanocomposites obtainable by prior art methods.

The invention claimed is:

1. A process for producing nanocomposites, the process comprising:
    a) introducing a sheet silicate-raw material comprising layers of silicate platelets into an aqueous medium to open up the layers of the silicate platelets,
    b) mixing the opened-up silicate platelet layers with at least one latex to form a first mixture,
    c) introducing the first mixture into a flow reactor and converting the mixture to a laminar extensional flow to further or completely separate the silicate platelets from one another,
    d) admixing and mixing:
        the first mixture having further or completely separated silicate platelets present therein, and
        a coagulant based on at least one acid or at least one salt, in at least one mixing unit for coagulation of latex coated platelets to form an intermediate, and
    e) collecting and isolating the intermediate in an alkaline, aqueous medium,
    wherein the latex comprises at least one rubber from the group of natural rubber, ethylene-propylene-diene rubbers, styrene/diolefin rubber, polybutadiene rubber, polychloroprene, polyisoprene, butyl rubber, halobutyl rubber, nitrile rubber, carboxylated nitrile rubber, hydrogenated nitrile rubber, and carboxylated hydrogenated nitrile rubber, and
    the mixing units are mixing nozzles or precipitation nozzles.

2. The process as claimed in claim 1, wherein the flow reactor has the configuration of a conically tapering tube.

3. The process as claimed in claim 1, wherein the conversion to a laminar extensional flow in the flow reactor is effected at a pressure of 0.2 to 30 bar.

4. The process as claimed in claim 2, wherein the conically tapering tube has an angle $\theta^*$ of 1 to 15°, where the angle $\theta^*$ indicates the slope angle of the flow reactor.

5. The process as claimed in claim 2, wherein the conically tapering tube has a narrowing factor $D_0/D_1$ of 1.1 to 20, where $D_0$ is the cross section of the conically tapering tube on commencement of the onset of extensional flow and $D_1$ is the cross section of the conically tapering tube prior to entry of the extensional flow into the at least one mixing unit.

6. The process as claimed in claim 5, wherein the conically tapering tube has a length L and generates an approximately hyperbolic flow profile in the laminar extensional flow over its length L.

7. The process as claimed in claim 2, wherein the approximately hyperbolic flow profile is a smooth hyperbolic profile of the laminar flow, without steps.

8. The process as claimed in claim 6, wherein a ratio $L/D_1$ is 100 to 400.

9. The process as claimed in claim 5, wherein:
the mixture is moved through the reactor and into the mixing unit at an applied pressure p,
a ratio of diameter $D_1$ to pressure p controls the extensional flow, the throughput, and the volume flow rates in the mixing unit for the coagulation, and
the ratio $D_1/p$ is 10–20/1–2.

10. The process as claimed in claim 1, wherein the at least one mixing unit comprises a mixing unit that works either by the external mixing principle, or by the internal mixing principle.

11. The process as claimed in claim 10, wherein the mixing unit comprises a mixing nozzle in which the coagulant is added into the laminar extensional flow by the internal mixing principle at right angles or obliquely relative to the laminar extensional flow in the flow reactor or after exit from the flow reactor.

12. The process as claimed in claim 11, wherein the coagulant is added into the extensional flow via three substreams, one at each of three points at a separation of 120° from one another.

13. The process as claimed in claim 12, wherein the three substreams of the coagulant are added to the extensional flow in the same cross section of the mixing nozzle.

14. The process as claimed in claim 11, wherein the feed rate of the coagulant relative to the extensional flow rate in the mixing nozzle is in a ratio of 1:100.

* * * * *